United States Patent
Gui et al.

(10) Patent No.: US 10,852,482 B1
(45) Date of Patent: Dec. 1, 2020

(54) PRECISION TFF POSA AND WDM SYSTEMS USING PARALLEL FIBER INTERFACE DEVICES

(71) Applicant: ALLIANCE FIBER OPTIC PRODUCTS, INC., Sunnyvale, CA (US)

(72) Inventors: Dong Gui, San Jose, CA (US); Qijun Xiao, Fremont, CA (US)

(73) Assignee: Alliance Fiber Optic Products, Inc., Sunnyvale, CA (US)

(*) Notice: Subject to any disclaimer, the term of this patent is extended or adjusted under 35 U.S.C. 154(b) by 0 days.

(21) Appl. No.: 16/427,748

(22) Filed: May 31, 2019

(51) Int. Cl.
| | |
|---|---|
| G02B 6/32 | (2006.01) |
| G02B 6/293 | (2006.01) |
| H04B 10/2581 | (2013.01) |
| H04J 14/02 | (2006.01) |
| C03C 27/04 | (2006.01) |

(52) U.S. Cl.
CPC ........ *G02B 6/29367* (2013.01); *C03C 27/048* (2013.01); *G02B 6/29382* (2013.01); *H04B 10/2581* (2013.01); *H04J 14/02* (2013.01)

(58) Field of Classification Search
CPC ............ G02B 6/29367; G02B 6/29382; H04J 14/02; H04B 10/2581; C03C 27/048
See application file for complete search history.

(56) References Cited

U.S. PATENT DOCUMENTS

| | | | | |
|---|---|---|---|---|
| 5,933,238 A * | 8/1999 | Ikuta | .................... | G01R 15/246 356/364 |
| 8,340,522 B2 * | 12/2012 | Yu | ........................ | G02B 6/2706 398/85 |
| 8,488,244 B1 | 7/2013 | Li et al. | | |
| 9,551,833 B1 | 1/2017 | Li et al. | | |
| 9,983,357 B2 * | 5/2018 | Miyata | ............... | G02B 6/29367 |
| 2004/0042736 A1 * | 3/2004 | Capewell | ............. | G02B 6/4215 385/89 |

(Continued)

FOREIGN PATENT DOCUMENTS

CN       108646352 A       10/2018

OTHER PUBLICATIONS

Invitation to Pay Additional Fees of the International Searching Authority; PCT/US2020/033900; dated Aug. 26, 2020; 10 pages; European Patent Office.

*Primary Examiner* — Ellen E Kim
(74) *Attorney, Agent, or Firm* — Adam R. Weeks

(57) ABSTRACT

The precision TFF POSA is formed by pressing a TFF glass rod array into a top surface of a master glass block to flatten the otherwise curved TFFs formed using conventional TFF deposition processes on glass. The TFF glass rod array is secured to the master glass block with a securing material to form a fabrication structure, which is singulated to form precision TFF POSAs having TFF members with flat TFFs and long TFF member long axes. A fiber interface device is arranged at a back surface of the TFF POSA. Other fiber interface devices having device axes are arranged proximate the TFF members. The device axes are parallel to the TFF member long axes to form a WDM system with a parallel configuration. In this configuration, there is one positionally adjustable fiber interface device for each wavelength channel, which allows for optimizing WDM optical communication in Mux and DeMux directions.

20 Claims, 17 Drawing Sheets

(56) References Cited

U.S. PATENT DOCUMENTS

| | | | |
|---|---|---|---|
| 2007/0236591 A1* | 10/2007 | Tam | H01L 27/1462 |
| | | | 348/308 |
| 2014/0133862 A1 | 5/2014 | Fujimura et al. | |
| 2014/0158274 A1* | 6/2014 | Erdogan | G02B 5/285 |
| | | | 156/60 |
| 2016/0238790 A1* | 8/2016 | Chen | G02B 6/4208 |
| 2017/0073266 A1* | 3/2017 | Amosov | C03C 3/097 |
| 2017/0115459 A1* | 4/2017 | Kamo | G02B 6/29367 |
| 2017/0184789 A1* | 6/2017 | Xiao | H04J 14/02 |
| 2018/0031768 A1 | 2/2018 | Miyata et al. | |
| 2018/0220208 A1* | 8/2018 | Gui | H04J 14/0202 |

\* cited by examiner

US 10,852,482 B1

PRECISION TFF POSA AND WDM SYSTEMS USING PARALLEL FIBER INTERFACE DEVICES

FIELD

The present disclosure relates to thin-film filter (TFF) passive optical system assemblies (POSAs) used in wavelength-division multiplexing (WDM) applications, and in particular to precision TFF POSAs and WDM systems using parallel fiber interface devices.

BACKGROUND

Modern-day optical telecommunications systems provide high-speed (large data rates) in part by combining (multiplexing or Mux) and de-combining (demultiplexing or DeMux) optical data signals encoded onto different wavelengths of light.

There are two common types of WDM platforms. The first type is based on an arrayed waveguide grating (AWG) planer lightwave circuit (PLC) assembly ("AWG-PLC assembly") and the second type is based on an optical thin-film filter (TFF) free-space passive optical system assembly ("TFF POSA"). TFF POSAs are superior regarding loss, passband ripple, passband width, isolation, and thermal stability as compared to AWG-PLC assemblies and so are preferred for many WDM applications.

FIG. 1A is an elevated view of a conventional TFF POSA 10 as described in U.S. Pat. No. 8,488,244, which is incorporated by reference herein. The TFF POSA 10 comprises a glass block 20 having a parallelogram y-z cross-sectional shape (i.e., has the form of a parallelepiped) in the local Cartesian coordinates shown. The glass block 20 has a body 21 that defines a front surface 22, a back surface 24 and sides 26. The back surface 24 includes a reflection coating 25 and an antireflection coating 27 arranged as shown on different portions of the back surface 24. The front surface 22 includes TFF members 30 arranged generally along the y-direction.

FIG. 1B is a top-down view of the TFF POSA 10 of FIG. 1A used to form a conventional WDM system 50. The WDM system 50 includes a lens array 60 that includes lens elements 62, with the lens elements 62 operably disposed proximate respective TFF members 30 and thus the lens array 60 running in the y-direction, which is taken as being "vertical" for ease of discussion. Thus, the lens array 60 is referred to as the vertical lens array 60. The TFF elements 30 are each configured to transmit a select wavelength and reflect other wavelengths. Four example TFF elements 30, denoted 30a, 30b, 30c and 30d are shown, respectively configured to transmit wavelengths $\lambda_a$, $\lambda_b$, $\lambda_c$ and $\lambda_d$.

The WDM system 50 also includes a vertical photonic device array 70 proximate the vertical lens array 60. The vertical photonic device array 70 comprises a support member 71 that operably supports first photonic devices 72 in the vertical direction. The vertical photonic device array 70 has a device axis Ad. The lens array 60 is disposed so that the lens elements 62 reside opposite the TFF members 30 and optically aligned therewith. Thus, the vertical photonic device array 70 follows the same orientation of the array of TFF members 30, i.e., the device axis Ad runs in the same direction as the stacking of the TFF members 30.

In example, the photonic devices 72 can be light emitters (e.g., LEDs, laser diodes, waveguides, fibers, etc.) or can be light detectors (e.g., photodiodes, waveguides, fibers, etc.).

Four example photonic devices 72a through 72d are shown and represent four different channel ports for four different channels.

The WDM system 50 also includes a multi-wavelength photonic device 80, which in an example can be multi-wavelength light emitter or multi-wavelength light receiver. In an example, the multi-wavelength photonic device 80 can be an optical fiber that supports optical waveguide modes at different (multiple) wavelengths, such the four wavelengths $\lambda_a$, $\lambda_b$, $\lambda_c$ and $\lambda_d$.

For the sake of discussion in describing the general operation of the TFF POSA 10 and the WDM device 50 formed thereby, assume that a multi-wavelength light beam 90 is emitted from the multi-wavelength photonic device 80 and collimated by a collimating lens 82. The multi-wavelength light beam 90 includes by way of example the four wavelengths $\lambda_a$, $\lambda_b$, $\lambda_c$ and $\lambda_d$ that define four different light beams 90a, 90b, 90c and 90d. This direction of light travel can be referred to as the "DeMux" direction since the multi-wavelength light beam 90 is later divided into its wavelength-component beams 90a, 90b, 90c and 90d, representing the four different example communication channels.

The multi-wavelength light beam 90 enters the glass block 20 at the anti-reflection coating 27 on the back surface 24. As noted above, each TFF member 30 is configured to transmit one of the wavelength components and reflect the others. Thus, for example, the TFF member 30a transmits the light beam 90a of wavelength $\lambda_a$ and reflects the remaining portion 90' of the light beam 90 at an angle towards the back surface 24. The reflective coating 25 thereon reflects the light beam 90' toward the next TFF member 30b, which transmits the light beam 90b and reflects the remaining portion 90" of the light beam 90' at an angle toward the back surface 24 and the reflective coating 25 thereon. The light beam 90" is then reflected by the reflective coating 25 to the TFF member 30c, which transmits the light beam 90c and reflects the remaining light beam 90'" at an angle toward the reflective coating. The remaining light beam 90'" travels to the TFF filter 30d, which transmits the light beam 90d. The transmitted light beams 90a through 90d are respectively incident upon the photonic devices 72a through 72d, which in the present example can be considered photodetectors or receiving fibers.

The WDM system 50 works well if the optical surfaces of the TFF POSA 10 are precision optical surfaces and if the vertical lens array 60 is properly aligned and has properly formed and aligned lens elements 62. As it turns out, forming sufficiently flat TFFs on the TFF members 30 is problematic. FIG. 2A includes two cross-sectional x-y views (using local (x,y,z) Cartesian coordinates) an example idealized TFF member 30 (left side) and an actual TFF member 30 (right side). The TFF member 30 includes a glass substrate 31 having a front surface 32 and a back surface 34. A TFF 40 resides on the front surface 32. The TFF 40 has thickness TH as measured in the direction of the local x-coordinate shown. The TFF 40 is formed using conventional thin-film deposition techniques known in the art and is initially deposited as a flat film with a uniform thickness TH.

Unfortunately, the TFF deposition process is performed at an elevated temperature. Upon cooling, the mismatch in the coefficients of thermal expansion (CTEs) between each deposition layer of the TTF 40, and between the glass substrate 31, cause the whole finished structure to accumulate enormous internal stress and have a thickness that varies across the filter after dicing. This variation is illustrated in the right-side TFF 30 and in FIG. 2B, which is a plot of the TFF thickness TH (μm) versus y-position (μm) based on measurements of an example TFF member 30. The plot of FIG. 2B shows that over a 350 μm distance, the thickness TH varies by about 200 nm. The overall variation in the thickness TH is about 0.5 μm. Thus, rather having the idealized form on the left side of FIG. 2A, the TFF member 30 actually has a curved surface due to the varying thickness TH of the TFF 40 as shown on the right side of FIG. 2A.

FIG. 3A is similar to FIG. 1B and shows a more realistic version of the TFF POSA 10 using the more realistic TFF members 30 as shown on the right side of FIG. 2B. FIG. 3A also illustrates how the reflected and transmitted light beams deviate from their ideal or reference optical paths (denoted by REF) in the y-direction due to reflecting from the curved TFF members 30, with increasing numbers of reflection resulting in an increasing amount of optical path deviation. FIG. 3B is a top-down view of the convention TFF POSA 10 of FIG. 3A and showing the deviation of the optical paths of the reflected light beams 90a through 90d as projected onto the y-z plane. The curved TFF members 30 act like convex mirrors rather than precision flat mirrors at the reflective wavelengths, thereby causing x and y deviations in the optical path at each reflection. Note also how the light path deviation increases with each reflection from a TFF 40 so that light path deviation is not a simple fixed offset but varies as a function of position and angle at the vertical photonic device array 70.

The x and y deviations of the optical paths of the reflected light beams can result in the transmitted light beams 92a through 92d not being ideally coupled with the photonic devices 72a through 72d of the vertical photonic device array 70. When the light beams 92a through 92d travel in the other direction (the Mux direction), then the x and y deviations of the light beams 92a through 92d originating from the vertical photonic device array 70 cause the light beams to miss being multiplexed at the multi-wavelength photonic device 80.

Thus, the optical path variations caused by the TFF members 30 having curved TFFs 40 can adversely impact WDM optically coupling to fibers, detectors, emitters, waveguides, etc. at the optical inputs/output ends. The problem is particularly acute for conventional WDM systems using vertical photonic device arrays with fixed-position photonic devices since there is no efficient way to obtain optical alignment of the photonic devices for each wavelength (channel). This complicates the formation of reliable, highly parallel WDM systems using conventional TFF POSAs.

SUMMARY

Aspects of the disclosure are directed to forming a precision TFF POSA. The precision TFF POSA is formed by pressing a TFF glass rod array into a top surface of a master glass block to flatten the otherwise curved TFFs formed using conventional TFF deposition processes on glass. The TFF glass rod array is secured to the master glass block with a securing material to form a fabrication structure, which is singulated to form precision TFF POSAs having TFF members with flat TFFs and TFF member long axes.

Another aspect of the disclosure includes operably arranging a first fiber interface device at a back surface of the TFF POSA. Second fiber interface devices having device axes are arranged proximate the TFF members. The device axes are parallel to the TFF member long axes to form a WDM system with a parallel configuration. In this configuration, there is one positionally adjustable fiber interface device for each wavelength channel, which allows for optimizing WDM optical communication in Mux and DeMux directions.

An aspect of the disclosure is directed to a method of forming a precision TFF POSA for WDM applications, comprising: forming a TFF glass rod assembly comprising two or more glass rods each having substantially parallel first and second surfaces, with the first surfaces supporting respective TFFs having different non-overlapping wavelength transmissions; arranging the TFF glass rod assembly on a top surface of a master glass block with the TFFs confronting the top surface; pressing the TFF glass rod assembly and master glass block together with a securing material therebetween to substantially reduce the amounts of curvature of the TFFs to form a fabrication structure wherein the TFFs have said substantially reduced amounts of curvature; and singulating the fabrication structure to form the precision TFF POSA.

Another aspect of the disclosure is directed to a method of forming a WDM system, comprising: forming a precision TFF POSA having a glass block section with first surface that supports two or more TFF members each having a TFF member long axis and a second surface having an antireflection coating and a reflective coating; operably disposing a first multi-fiber interface device adjacent the antireflection coating; operably disposing two or more second multi-fiber interface devices adjacent the two or more TFF members respectively, wherein each second multi-fiber interface device has a device axis that runs in substantially the same direction as the TFF member long axis; and positionally adjusting one or more of the second multi-fiber interface devices to optimize optical communication between the first multi-fiber interface device and the second multi-fiber interface devices.

Another aspect of the disclosure is directed to a WDM system, comprising: a precision thin-film filter (TFF) passive optical structure assembly (POSA) having a first surface with two or more TFF members having different non-overlapping wavelength transmissions and each having a TFF member long axis, and a second surface having an antireflection coating and a reflective coating; a first multi-fiber interface device operably disposed adjacent the antireflection coating; and two or more second multi-fiber interface devices operably disposed the two or more TFF members respectively, wherein each second multi-fiber interface device has a device axis that runs in substantially the same direction as the TFF member long axis, and wherein one or more of the second multi-fiber interface devices are operably supported by respective one or more positionally adjustable mounts.

Another aspect of the disclosure is directed to a precision TFF POSA formed by the process comprising: forming a TFF glass rod assembly comprising two or more glass rods each having substantially parallel first and second surfaces, with the first surfaces supporting respective TFFs having different non-overlapping wavelength transmissions; arranging the TFF glass rod assembly on a top surface of a master glass block with the TFFs confronting the top surface; pressing the TFF glass rod assembly and master glass block together with a securing material therebetween to substantially reduce the amounts of curvature of the TFFs; securing the TFF glass rod assembly to the master glass block with the securing material to form a fabrication structure wherein the TFFs have said substantially reduced amounts of curvature; and singulating the fabrication structure to form the precision TFF POSA.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation. Different Cartesian coordinates are also used in different Figures and can be considered as local Cartesian coordinates for the item, component, part, assembly, etc. being described.

Relative terms like front, back, top, bottom, etc. are used for ease of description and are not intended to be limited as to direction or orientation.

In the discussion below, the TFFs are said to have different non-overlapping wavelength transmissions, meaning that the TFFs have different wavelength transmission bandwidths centered on different wavelengths (center wavelengths), wherein the center wavelengths and the transmission bandwidths are such that there is either no overlap or no substantial overlap (e.g., less than 10% overlap) of the transmission bandwidths for adjacent center wavelengths. The transmission wavelengths discussed below (e.g., $\lambda_a$, $\lambda_b$, . . . ) are center wavelengths unless otherwise noted.

Fabrication Structure for Forming Precision TFF POSAs

An aspect of the disclosure is directed to a method of fabricating a precision TFF POSA. The method includes forming a fabrication structure that can be divided up into multiple precision TFF POSAs.

Figure 4A:
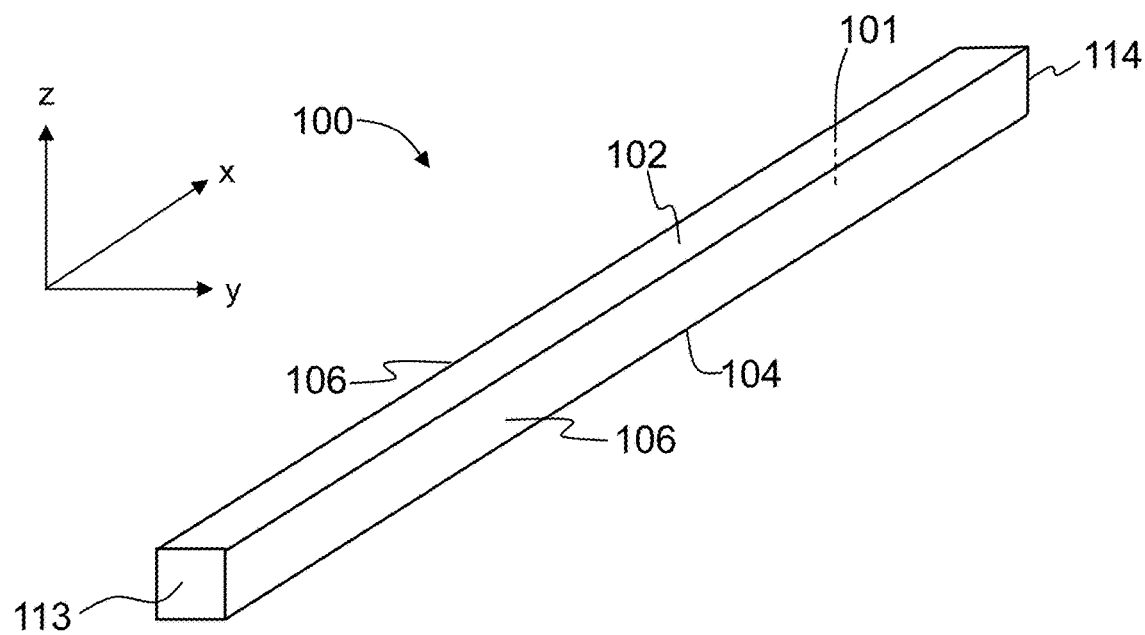
FIG. 4A is an elevated view of an example glass rod having a rectangular cross section.

A first step in the fabrication method utilizes multiple optical-quality glass rods. FIG. 4A is an elevated view of an example optical quality glass rod 100 having a rectangular (e.g., square) cross-sectional shape. The glass rod has body 101 that defines opposed first and second surfaces 102 and 104 (which may be referred to as top and bottom surfaces), opposite sides 106, a front end 113 and a back end 114. In an example, at least the first and second surfaces 102 and 104 are precision surfaces, i.e., have a high degree of optical flatness.

Figure 1A:
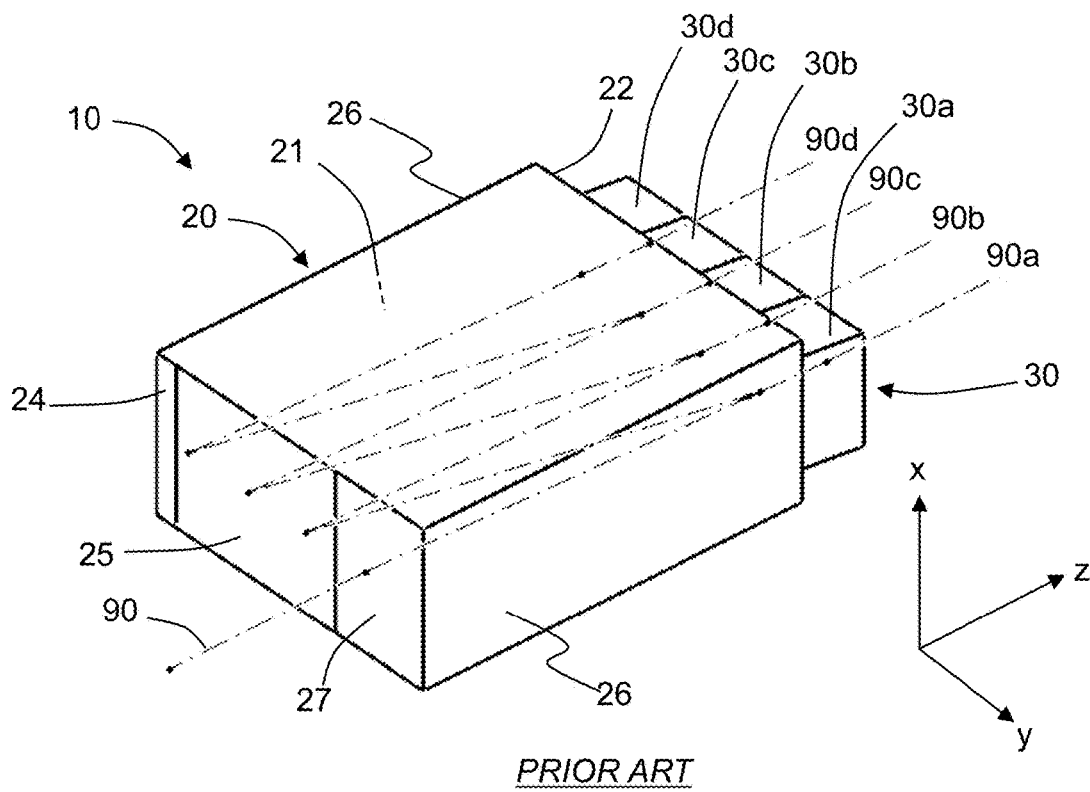
FIG. 1A is an elevated view of a conventional TFF POSA.
Figure 1B:
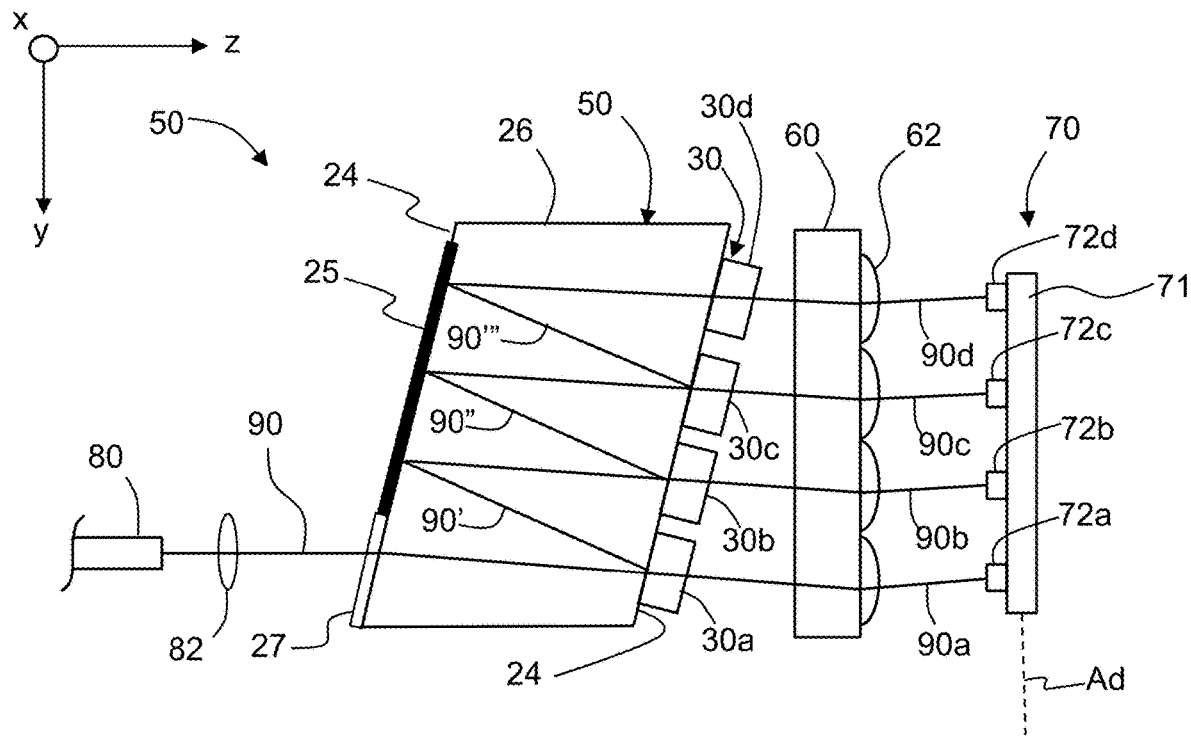
FIG. 1B is a top-down view of an example WDM system that utilizes the conventional TFF POSA of FIG. 1A along with a vertical photonic device array with fixed photonic devices.
Figure 2A:
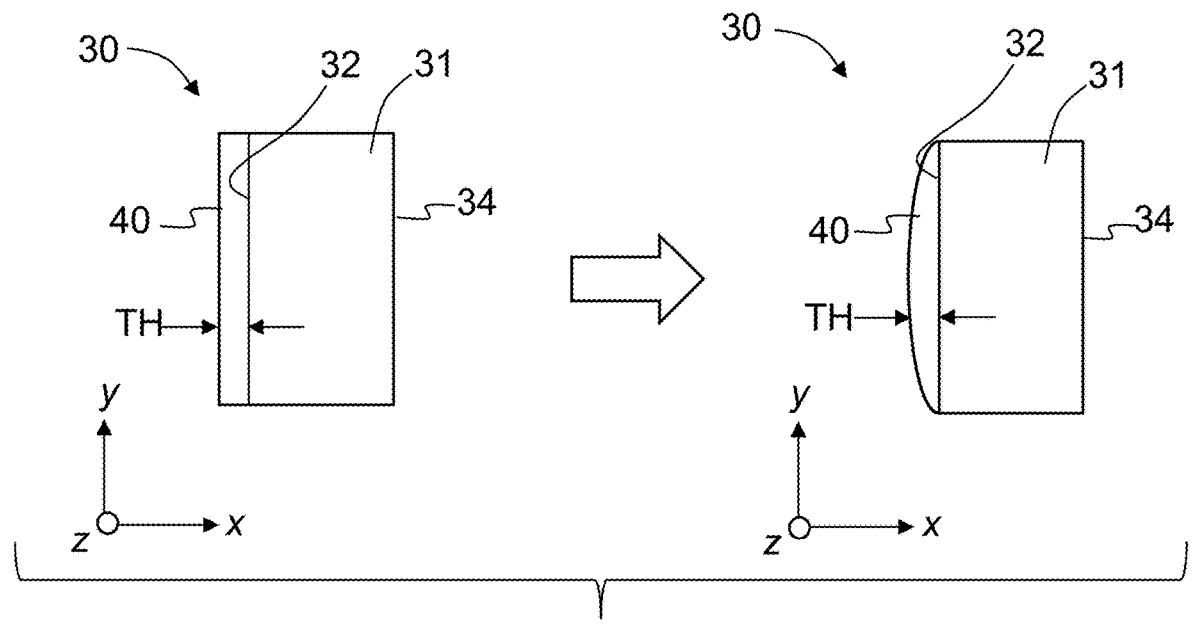
FIG. 2A shows two x-y cross-sectional views (in local (x,y,z) Cartesian coordinates) of a TFF member of the TFF POSA, wherein the left-side TFF is an idealized view that shows the TFF having a uniform thickness and the right-side TFF represents a more realistic view wherein the TFF has a varying thickness profile that defines a curved TFF.
Figure 2B:
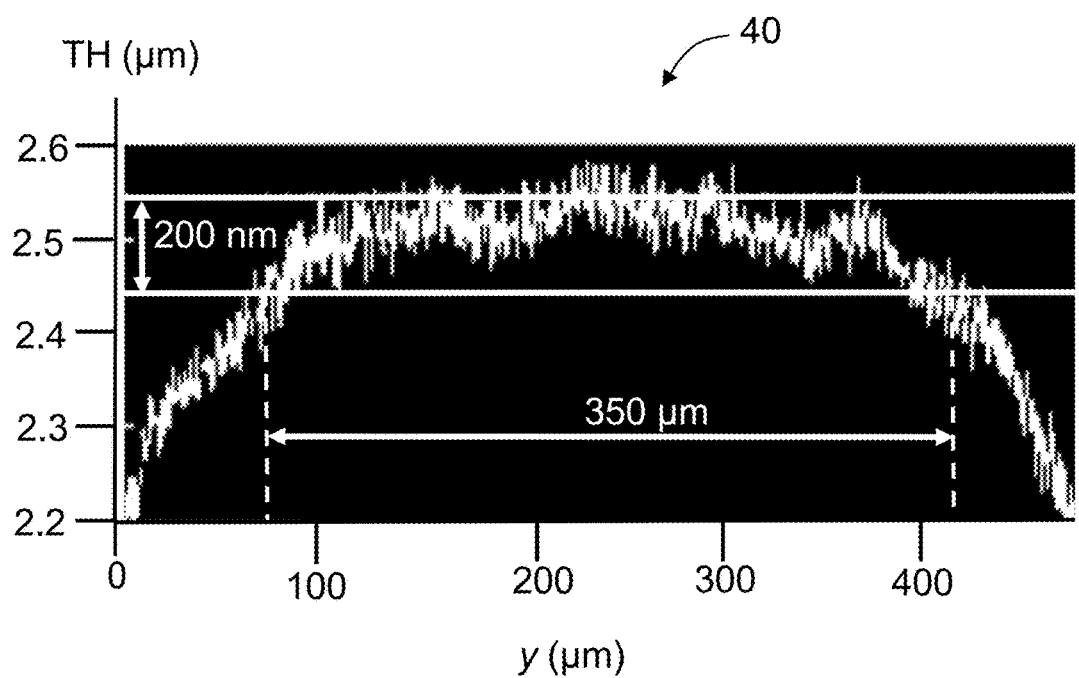
FIG. 2B is a plot of the thickness (microns, μm) versus y-position (μm) showing an example measurement of the TFF of a TFF member wherein the TFF has a thickness variation of 200 nanometers (nm) over a 350 μm section of the TFF.
Figure 3A:
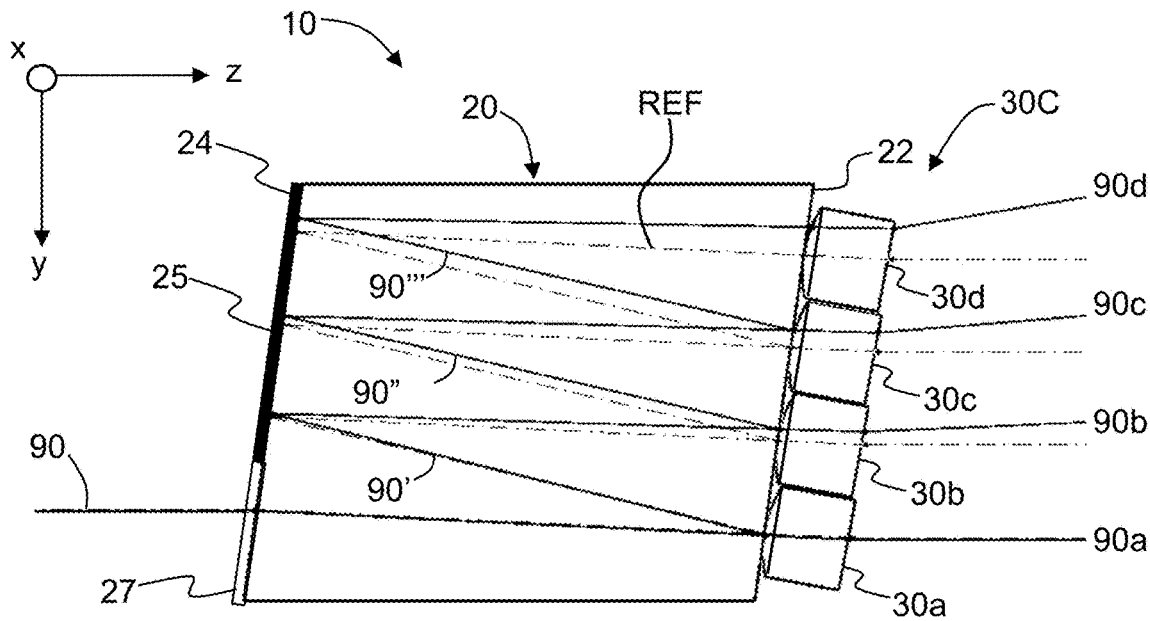
FIG. 3A is a top-down view of the conventional TFF POSA with the more realistic TFF members shown in the right-hand side of FIG. 2B, and showing the deviation of the optical paths of the reflected light beams as projected onto the y-z plane relative to an ideal or reference optical path.
Figure 3B:
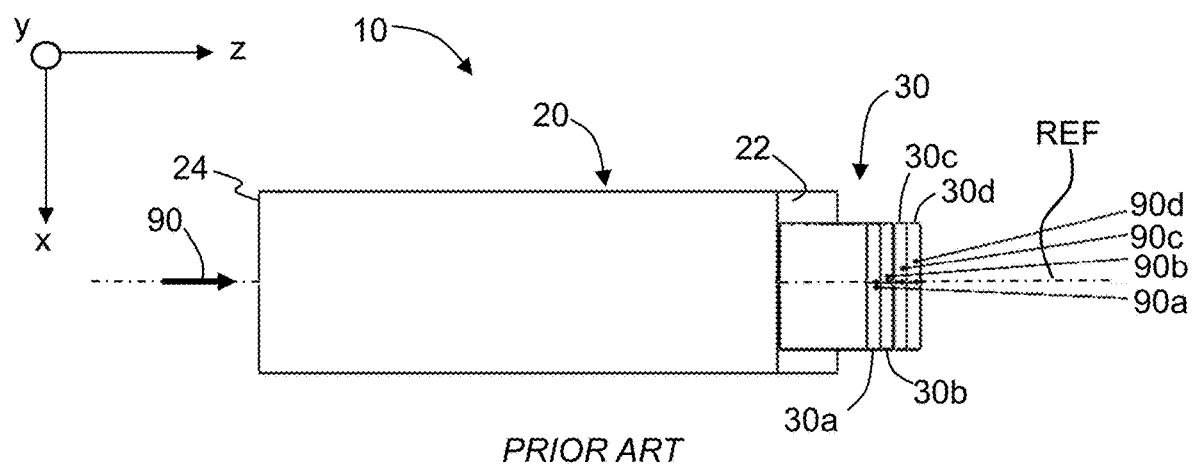
FIG. 3B is a side view of the conventional TFF POSA of FIG. 3A, showing the optical path deviations of the light beams as projected onto the x-z plane.
Figure 4B:
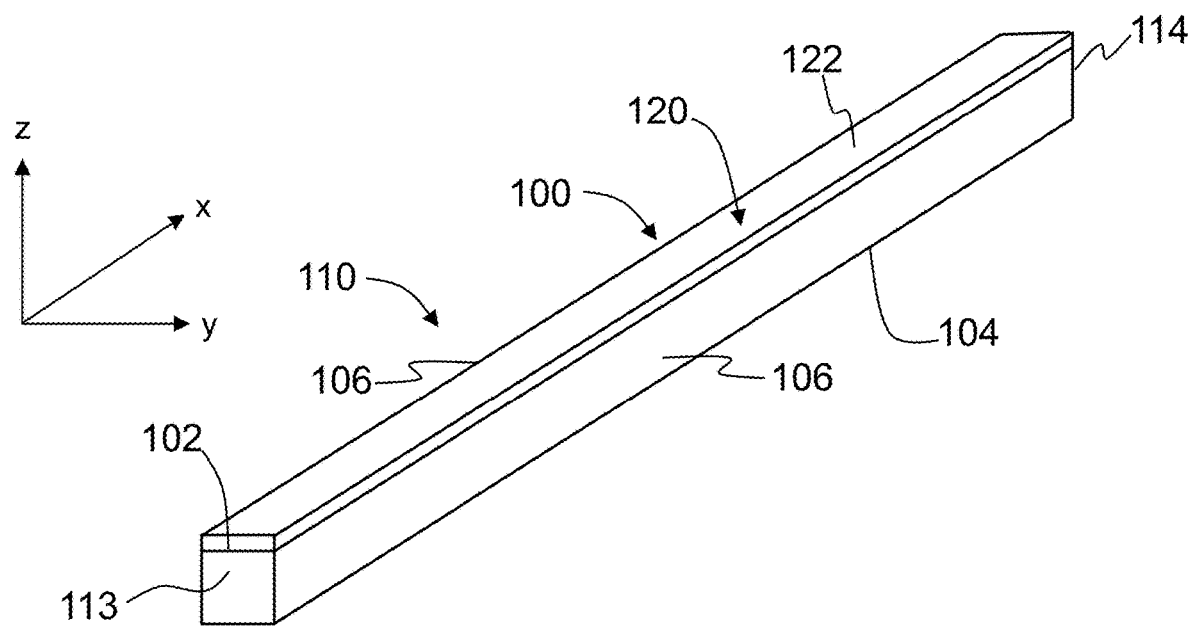
FIG. 4B is similar to FIG. 4A and shows the glass rod having a TFF formed on its top surface to define a TFF glass rod.

FIG. 4B is similar to FIG. 4A and illustrates the next step in the fabrication method wherein a TFF 120 is formed on the first surface 102 of the glass rod 100 to form a TFF glass rod 110. The TFF 120 is formed using conventional thin-film deposition processes known in the art. It is noted here that at this stage, the TFF 120 is curved due to the aforementioned difference in the CTEs of the TFF and the glass rod (see FIG. 2A). The TFF 120 has a surface 122.

Figure 4C:
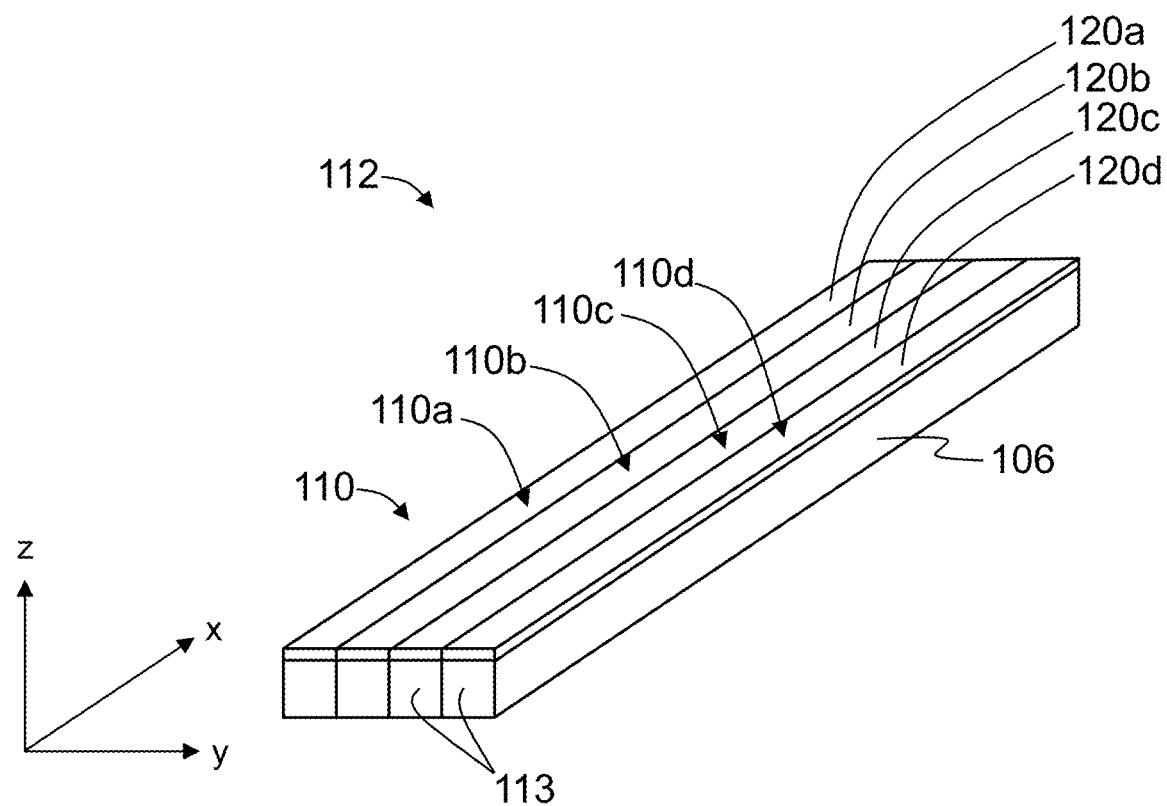
FIG. 4C is an elevated view showing a TFF glass rod assembly formed by placing and securing the TFF glass rods side by side with the TFFs facing upward.

FIG. 4C is similar to FIG. 4B and shows the next step in the fabrication method, which involves forming an array ("TFF glass rod array" or "TFF glass rod assembly") 112 of TFF glass rods 110. The example TFF glass rod array 112 includes four TFF glass rods 110, which are denoted as 110a through 110d and which are arranged side-by-side so that the TFFs 120 (120a through 120d) reside in a common plane. The first surfaces 102 of the TFF glass rods 110 are parallel or substantially parallel (the latter referring to an intention to be parallel, but accounting for manufacturing tolerances). The front ends 113 also reside in a common plane. The TFF glass rods 110a through 110d have respective TFFs 120a through 120d corresponding to four different wavelength transmissions, i.e., four different transmission wavelengths $\lambda_a$, $\lambda_b$, $\lambda_c$ and $\lambda_d$. The four TFF glass rods 110 can be secured to each other at their respective sides 106 using a securing material (not shown), such as an ultraviolet (UV) curable adhesive, or other conventional glass-securing means known in the art. In an example of the method, the glass rods 100 can be arranged and secured side-by-side and then the TFF formed on the first surfaces 102 of the collected glass rods. While four example TFF glass rods 110 are shown, in general the TFF glass rod array 112 can be formed from two or more TFF glass rods.

Figure 4D:
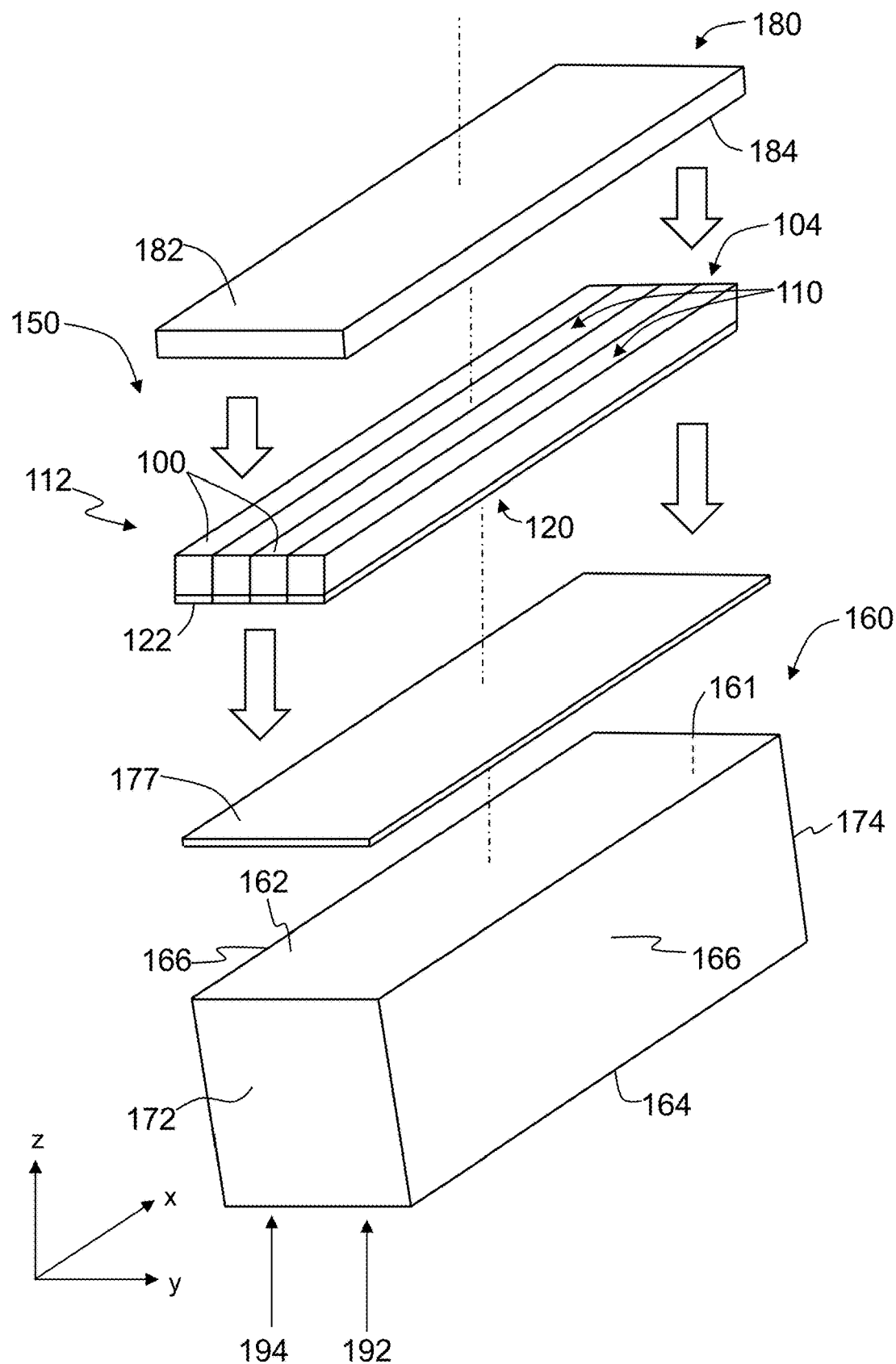
FIG. 4D is an exploded view of an example fabrication structure used to form the precision TFF assemblies disclosed herein.

FIG. 4D is an elevated and exploded view of example fabrication structure 150 formed by the next steps in the fabrication method. The fabrication structure 150 includes the TFF glass rod assembly 112 as described above and a master glass block 160. In an example, the master glass block 160 has a parallelogram cross-sectional shape in the y-z plane while being elongate in the x-direction (e.g., has a parallelepiped shape). The master glass block 160 has a body 161, a top surface 162, a bottom surface 164, opposite sides 166, a front end 172 and a back end 174. In an example, the master glass block is made of an optical-quality glass, such as fused quartz.

The TFF glass rod assembly 112 is arranged above the top surface 162 of the master glass block 160 with the TFFs 120 facing the top surface of the master glass block 160. A transparent securing material 177 is used to secure the TFF glass rod assembly 112 to the top surface 162 of the master glass block 160 and so is shown residing between the TFF glass rod assembly 112 and the master glass block 160. As examples, the securing material 177 may comprise an ultraviolet (UV) curable adhesive, a thermally activated adhesive, epoxy, or a dual-activated adhesive or epoxy. In some example embodiments, the securing material is index-matched to the refractive index of the material making up the body 161 of the master glass block 160. In an example, the securing material 177 cures by chemical reaction over time, i.e., does not require outside activation to cause curing.

FIG. 4D also shows a plate 180 arranged above the TFF glass rod assembly 112 facing the second surfaces 104 of the glass rods 100. The plate 180 has a top surface 182 and a bottom surface 184. The plate 180 is optional and is not a component of the fabrication structure 150 and is shown because it is used in an example of making the fabrication structure, as seen below. In an example, the plate 180 is transparent, and further in the example is made of glass. Because the plate resides atop the TFF glass rod assembly 112, it is also referred to below as the top plate 180.

The next fabrication step can include adding an anti-reflection coating 192 and a reflective coating 194 to respective sections of the bottom surface 164 of the master glass block 160 (see also FIGS. 5B and 5C, introduced and discussed below). This step can also be performed earlier or later in the fabrication process.

Figure 4E:
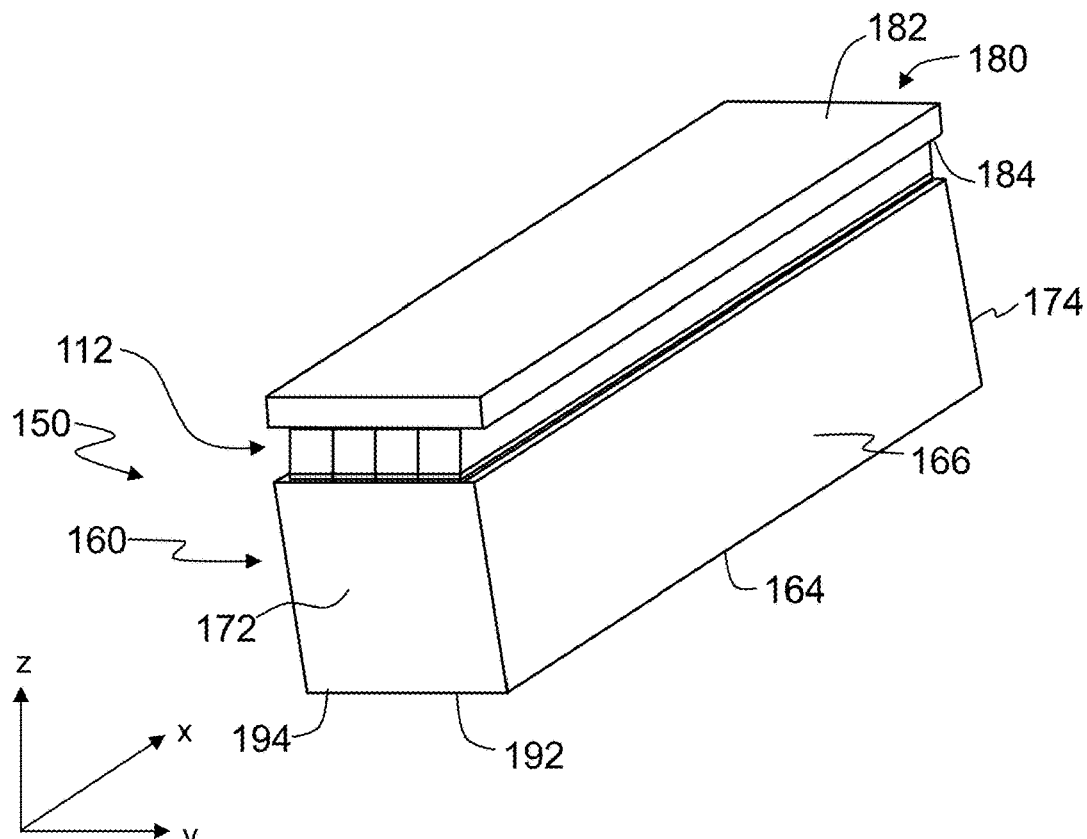
FIG. 4E is an elevated view showing the initially assembled example fabrication structure of FIG. 4D, along with a top plate used in finalizing the fabrication structure.

FIG. 4E is similar to FIG. 4D and shows the next step in the fabrication wherein the fabrication structure 150 is assembled by placing the TFF glass rod assembly 112 on top surface 162 of the master glass block 160 with the securing material 177 between. At this time, the securing material 177 remains substantially uncured. The top plate 180 is placed on the TFF glass rod assembly 112 on the second surfaces 104 of the glass rods 100, which are now facing upwards.

Figure 5A:
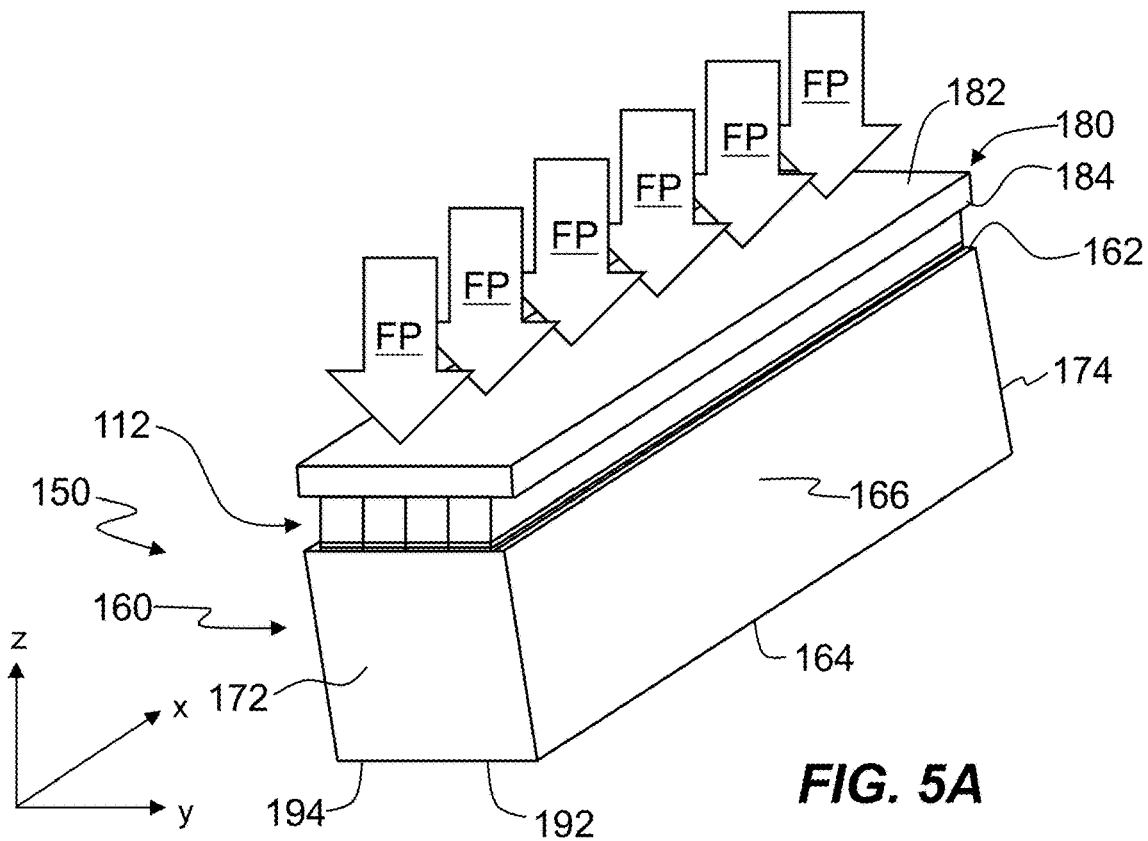
FIG. 5A is and elevated view similar to FIG. 4E and shows the application of a pressing force on the top plate to press the TFFs and the securing material into the top surface of the master glass block, which flattens the TFFs.
Figure 5B:
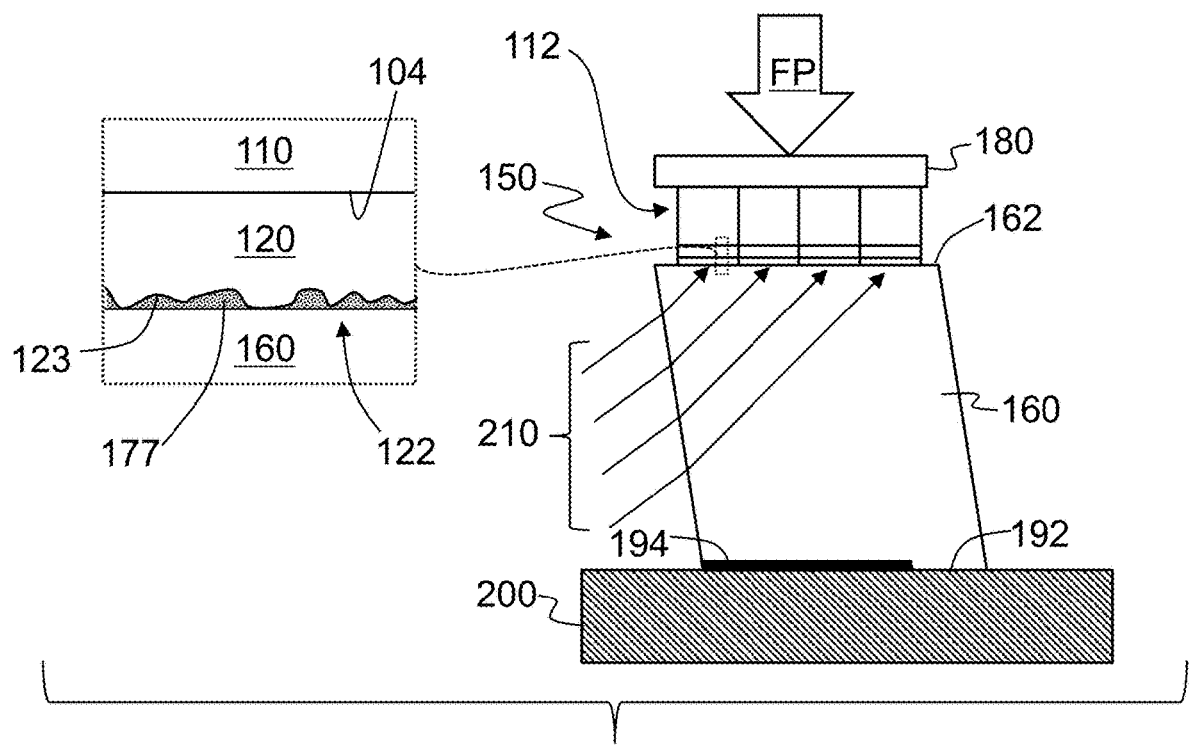
FIGS. 5B and 5C are cross-sectional views of the fabrication structure of FIG. 5A showing two different examples of the application of the pressing force, and also showing an example of curing of the securing material through the master glass block, with the close-up inset of FIG. 5B showing micro-recesses on the TFF surface of one of the TFFs and securing material residing within the micro-recesses.

FIGS. 5A and 5B show the next step in the fabrication process of applying a downward of pressing force FP on the top plate 180 while the fabrication structure 150 rests upon a solid (firm) support structure 200. FIG. 5C shows a similar alternative method step of applying a pressing force FP to both sides to the fabrication structure 150, which can include using a second (bottom) plate 180 at the bottom surface 164 of the master glass block 160. In an example, the pressing force FP can be generated by a heavy object or by placing the fabrication structure 150 in a squeezing device 186, such as a vice or clamp (FIG. 5B).

The application of a pressing force FP presses the TFF 120 of each TFF glass rod 110 against the securing material 177 and the top surface 162 of the master glass block 160. This flattens out the curved TFFs 120, i.e., substantially reduces the amount of curvature in the TFFs. In examples, the substantial reduction in curvature is at least 5% or at least 10% or at least 20% or at least 30% or at least 40% or at least 50% or at least 75% or at least 100% of the variation in the thickness variation of the TFF over its surface or a portion of its surface that is used in the reflection and transmission of light. The phrase "at least X %" refers to a range from X % to 100%.

Figure 5C:
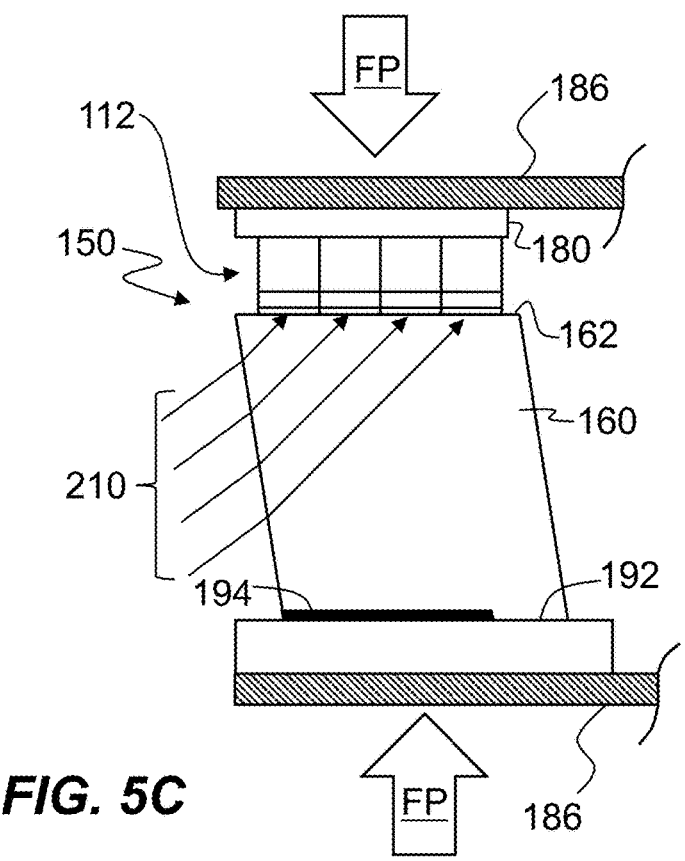

As the pressing force FP is being applied, the securing material 177 can be cured, e.g., by transmitting actinic radiation 210 (e.g., UV light or infrared light (heat)) through the master glass block to the securing material, as shown in FIGS. 5A through 5C, or simply by allowing the securing material 177 to cure on its own. This fixes the TFF glass rod assembly 112 in place on the master glass block 160 and also fixes the now substantially flat (i.e., substantially reduced curvature) TFFs 120 (e.g., 120a through 120d). Once the securing material 177 is cured, the pressing force(s) FP can be removed, along with one or both plates 180.

The close-up inset of FIG. 5B (which is not to scale) shows a close up of the surface ("TFF surface") 122 of the TFF 120 pressed up against the top surface 162 of the master glass block 160 as part of the process to flatten the TFFs 120. In practice the TFF surface 122 is not perfectly smooth and includes micro-recesses 123 into which the securing material 177 can flow and reside when the TFF glass rod assembly 112 is pressed into the master glass block 160.

At least a portion of the micro-recess 123 are substantially smaller than the wavelengths of light used in WDM applications. Since the securing material 177 is preferably index matched to the master glass block 160, the filling of the micro-recess 123 with securing material renders them anodyne with respect to optical performance. On the other hand, the securing material 177 residing in the micro-recesses 123 (when cured) acts to secure the TFF glass rod assembly 112 to the master glass block 160 while allowing for the TFF surface 122 to be substantially flattened by pressing the TFF surface into the top surface 162 of the master glass block 160 prior to curing.

In an example, the micro-recess 123 can be used to conduct the securing material 177 from the edges of the TFF glass rod assembly 112 and the master glass block 160 into the center of the interface between the TFF glass rod assembly and the master glass block via capillary action.

Any excess securing material 177 squeezed out of the interface between the TFF glass rod assembly 112 and the master glass block 160 during the pressing process can be removed prior to or after curing. Note that in FIGS. 5B and 5C, the securing material 177 is shown as a layer between the top surface 162 of the master glass block 160 and the TFFs 120. This is for ease of illustration and explanation, and as described above the TFFs 120 press into the top surface 162 of the master glass block 160, with the securing material residing in the micro-recesses 123.

Figure 6A:
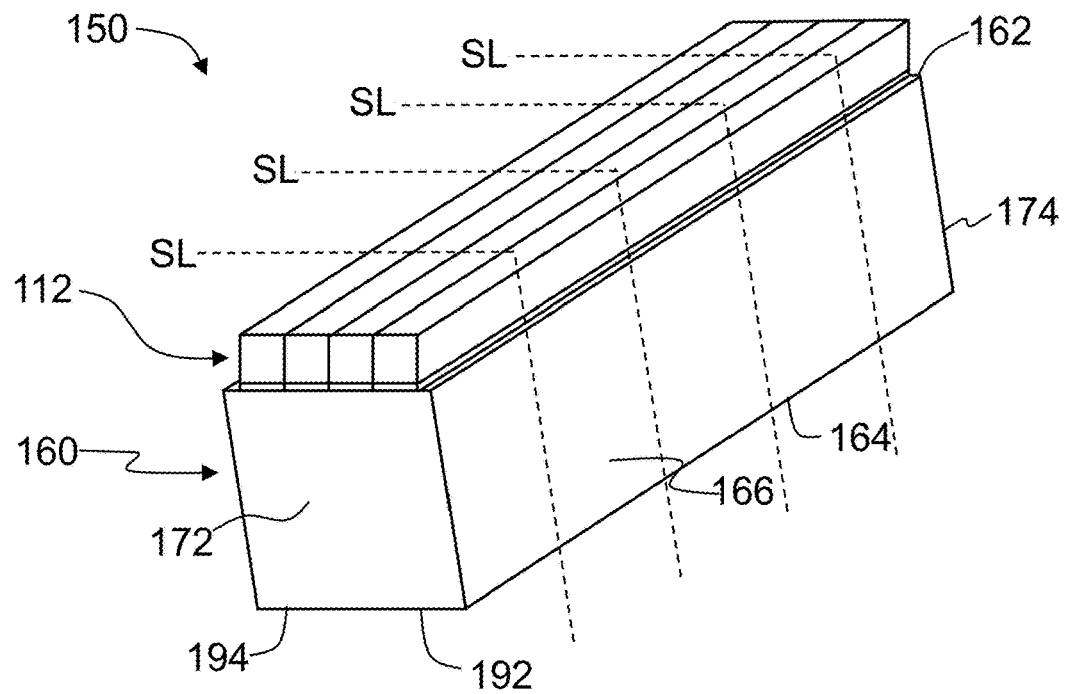
FIG. 6A is an elevated view of the finalized fabrication structure showing example singulation lines for singulating the fabrication structure to form precision TFF POSAs as disclosed herein.
Figure 6B:
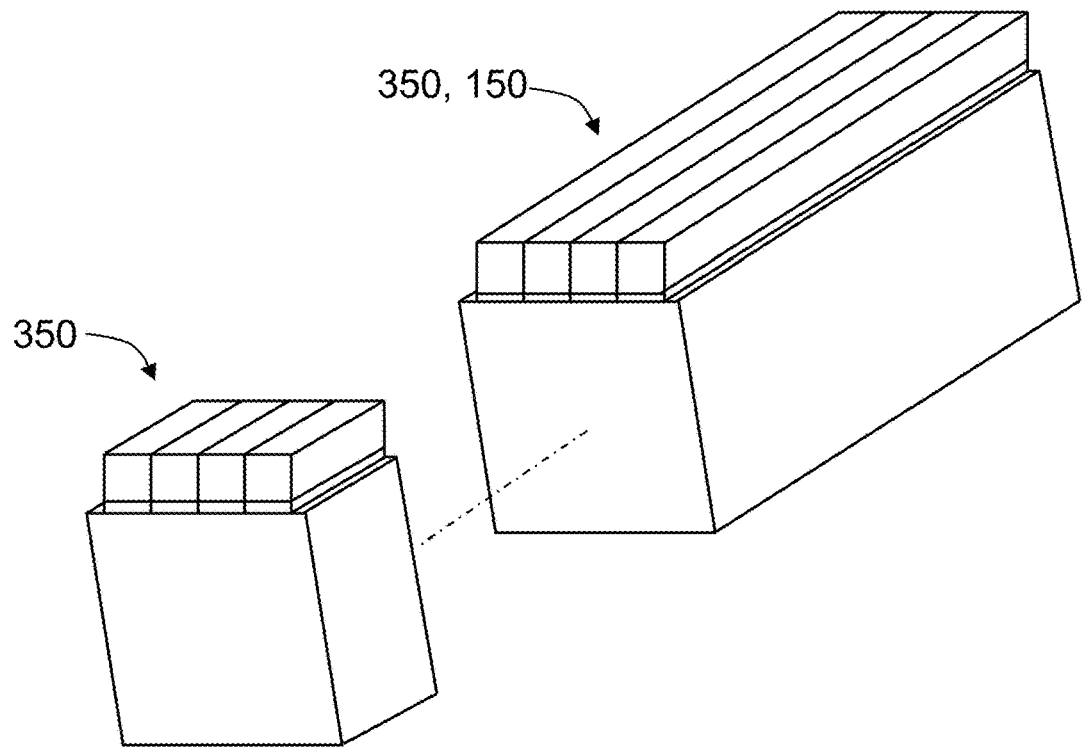
FIG. 6B is an elevated view similar to FIG. 6A and shows an example precision TFF POSA singulated (separated) from the fabrication structure.

FIG. 6A shows the resulting fabrication structure 150. The layer of securing material 177, having accomplished its goal, is now omitted for ease of illustration. FIG. 6A shows example separation lines SL that indicate where the fabrication structure 150 can be separated into multiple sections to define individual TFF POSAs 350, as shown in FIG. 6B. In an example, the fabrication structure 150 can be separated (singulated) using a mechanical cutting process (e.g., sawing) or laser-based cutting process. In an example, the fabrication structure 150 can itself serve as the TFF POSA 350.

Figure 6C:
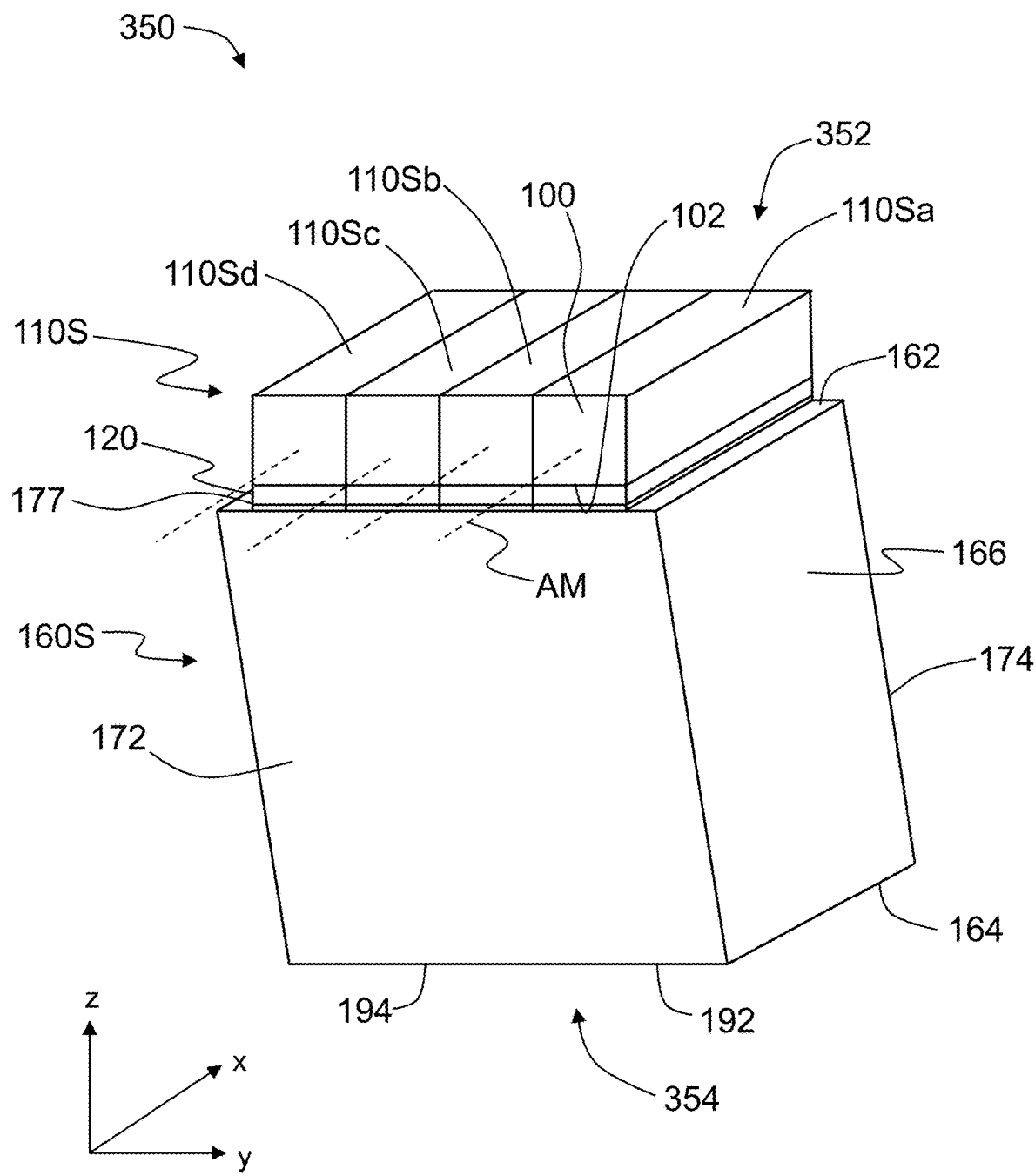
FIG. 6C is a close-up elevated view of an example precision TFF POSA.

FIG. 6C is a close-up elevated view of the TFF POSA 350 of FIG. 6B. The TFF POSA 350 comprises a glass block section 160S, which as described above is a section of the master glass block 160. The glass block section 160S comprises the same body 161 of the master glass block and thus the same top surface 162, bottom surface 164, and sides 166, and in an example has the same parallelepiped shape. The glass block section 160S also comprises front and back ends 172 and 174, at least one of which is "new" front and/or back end formed by singulation process. The TFF POSA 350 has a front end 352 and a back end 354.

The TFF POSA 350 also has TFF members 110S defined by respective sections of the TFF glass rods 110 of the fabrication structure 150. Each TFF member 110S includes its corresponding TFF 120 formed on the first surface 102 of the glass rod 100. Each TFF member 110S has a central (long) axis AM that runs in the x-direction. This central (long) axis AM is also referred to as the TFF member axis AM.

The securing material 177 is also shown in representative form as layer residing between the top surface 162 of the glass block section 160S and the TFFs 120 of the TFF members 110S. The four example TFF members 110S are denoted 110Sa, 110Sb, 110Sc and 110Sd and are configured to respectively transmit the four example wavelengths $\lambda_a$, $\lambda_b$, $\lambda_c$ and $\lambda_d$. Because the fabrication structure 150 is made using the method described above, the TFFs 120 of the TFF members 110S of the TFF POSA 350 are substantially flat.

Multi-Fiber Optical Interface Device

Figure 7A:
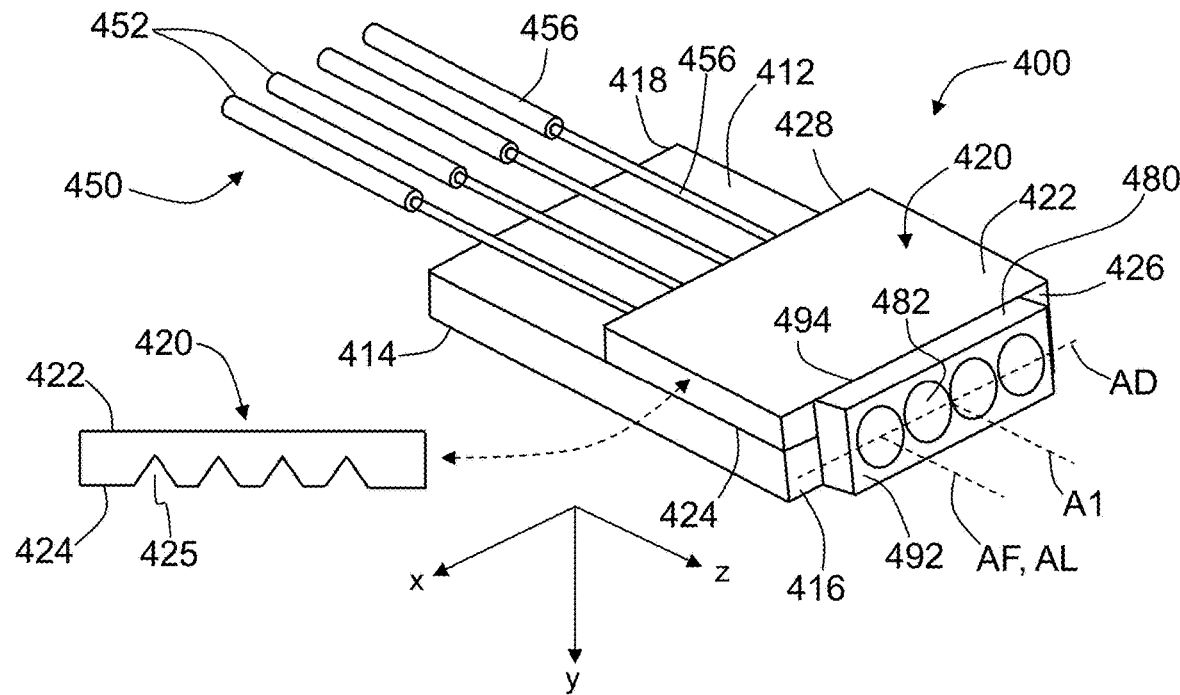
FIGS. 7A and 7B are front and back elevated views of an example multiple-optical-fiber interface device ("multi-fiber interface device" or "fiber interface device") comprising an array of optical fibers supported by a fiber array unit (FAU) and including an integrated collimator lens array.
Figure 7B:
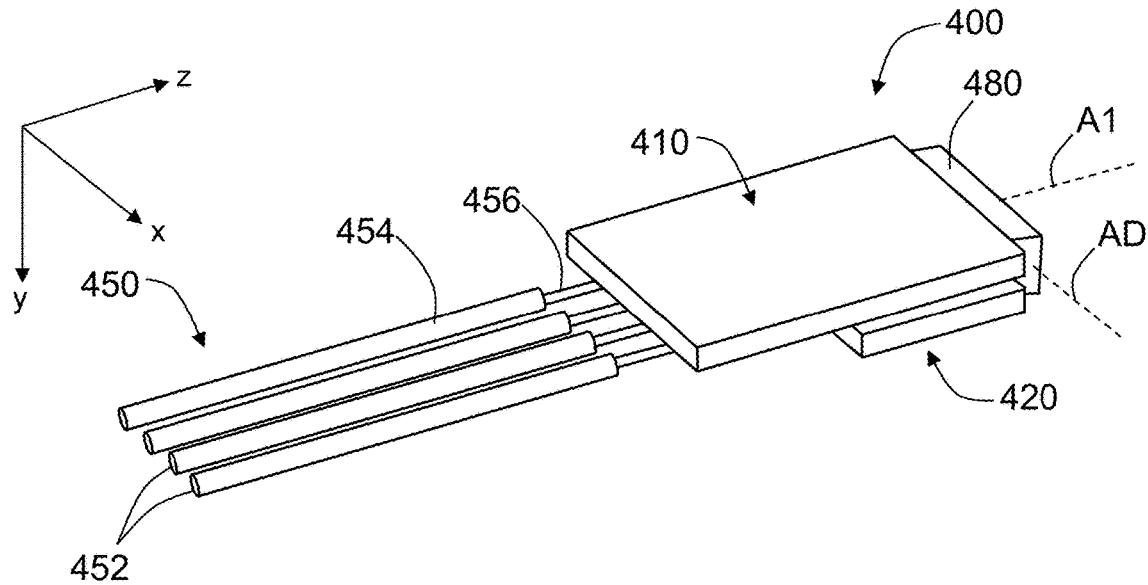
Figure 7C:
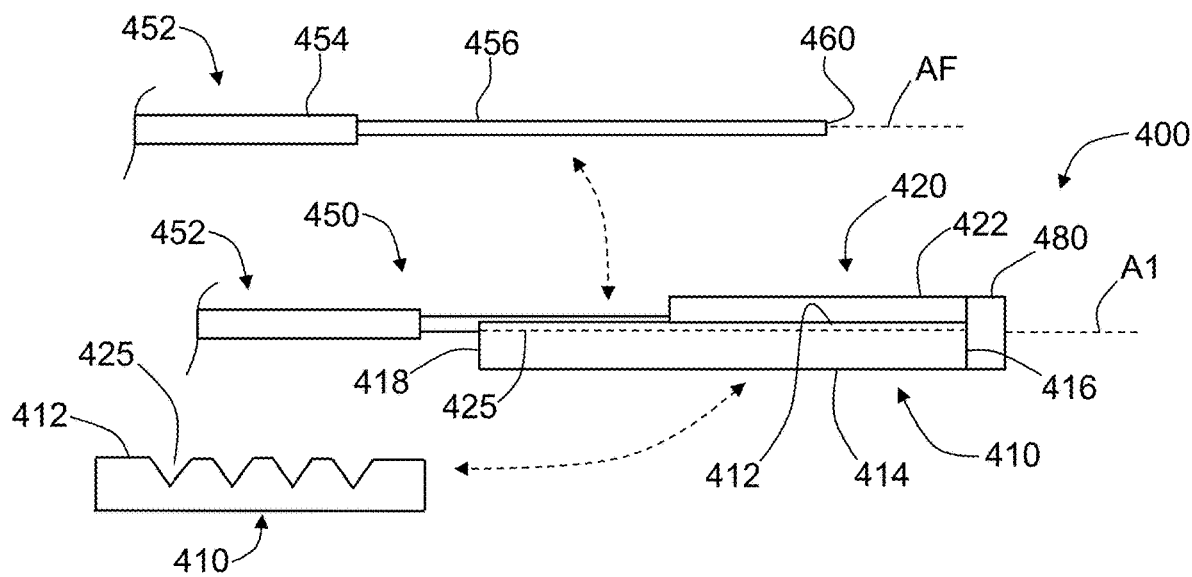
FIG. 7C is a side view of the fiber interface device of FIGS. 7A and 7B, showing a close-up view of one of the optical fibers and also showing example grooves in the support substrate of the FAU sized to accommodate the optical fibers.

The TFF POSA 350 can be used to form a WDM system, as described below. This can be accomplished by employing a photonic device array, which can be, for example here, multi-fiber optical interface devices, or just "multi-fiber interface devices" or "fiber interface devices" for short. As already stated, these design structures are merely exemplary, and are intended to provide an overview or framework to understand the nature and character of the claims. FIGS. 7A and 7B are elevated views and FIG. 7C is a side view of an example fiber interface device 400 having a central (long) axis A1 that runs in the z-direction and a device axis AD that runs in the x-direction. The device axis AD and the long axis A1 define a device plane, which in FIGS. 7A and 7B is the x-z plane.

Figure 7D:
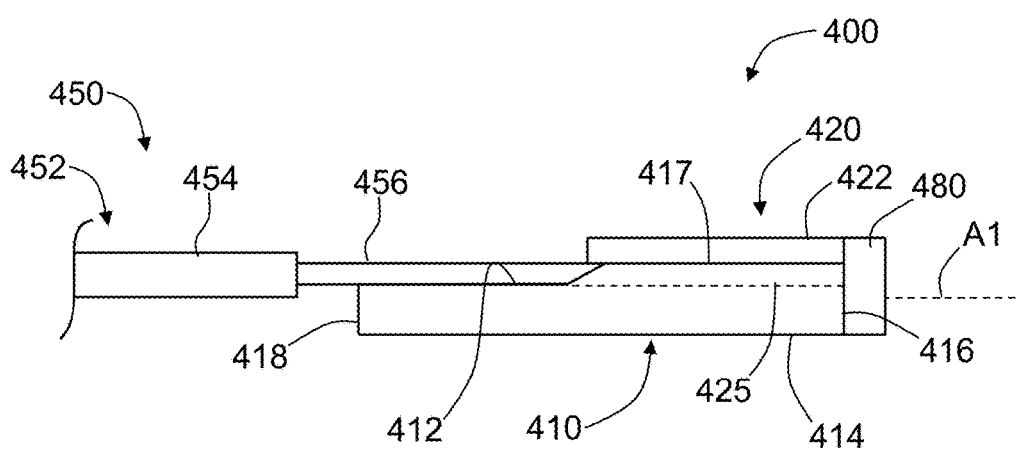
FIG. 7D is a side view similar to FIG. 7C and shows an example configuration of the support substrate as having a raised front-end section that includes grooves.

The fiber interface device 400 includes a support substrate 410 having a top surface 412, a bottom surface 414, a front end 416 and a back end 418. The fiber interface device also includes a cover 420 having a top surface 422, a bottom surface 424, a front end 426 and a back end 428. In an example shown in the close-up inset, the bottom surface 424 of the cover 420 can have grooves 425, such as V-grooves, that run in the direction of the central axis A1. In an example, the top surface 412 can have grooves 425, such as shown in FIG. 7C. FIG. 7D is similar to FIG. 7C and shows an example where the support substrate 410 includes a raised front-end section 417 in which the grooves 425 are formed.

The fiber interface device 400 also includes an array ("fiber array") 450 of optical fibers 452. Each optical fiber 452 has a coated section 454 and a bare section 456, with at least a portion of the bare section 456 supported by the support substrate 410. The cover 420 acts to hold the fiber bare sections 456 in place on the support substrate. The grooves 425 in one or both of the support substrate 410 and cover 420 serve to maintain alignment of the fiber bare sections 456. As best seen in FIG. 7C, each optical fiber 452 has an end face 460 that resides at or near the front end 416 of the support substrate 410. Each optical fiber 452 also has a fiber axis AF.

The fiber interface device 400 also includes a lens array unit 480 that includes lens elements 482 each having a lens axis AL. The lens array unit 480 (also referred to as "collimating lens array") includes a front end 492 and a back end 494. In an example, the lens elements 482 comprise gradient-index (GRIN) lenses, which do not a curved surface. In another example, the lens elements 482 are conventional lens elements (microlenses) having at least one curved surface. The lens elements 482 are arranged in a row that runs in the x-direction, i.e., along the device axis AD. The optical fibers 452 reside in the device plane or in a plane parallel to the device plane as defined by axes A1 and AD.

The lens array unit 480 resides at the front end 416 of the support substrate 410 and is disposed such that the fiber axes AF of the optical fibers 452 in the fiber array 450 are aligned with (i.e., coaxial with) respective lens axes AL of the lens elements 482 of the lens array unit 480. In this regard, the grooves 425 in one or both of the support substrate 410 and the cover 420 facilitate this alignment. In an example, the front end 426 of the cover 420 is in contact with the back end 494 of the lens array unit 480. In an example, a securing material (not shown) is used to secure the optical fibers 452, the support substrate 410, the cover 420 and the lens array unit 480. In an example, the support substrate 410, the cover 420 and the optical fibers 452 constitute a fiber array unit (FAU). The combination of the FAU and the lens array unit 480 (and thus the fiber interface device 400 itself) can be referred to as a collimated FAU.

Figure 7E:
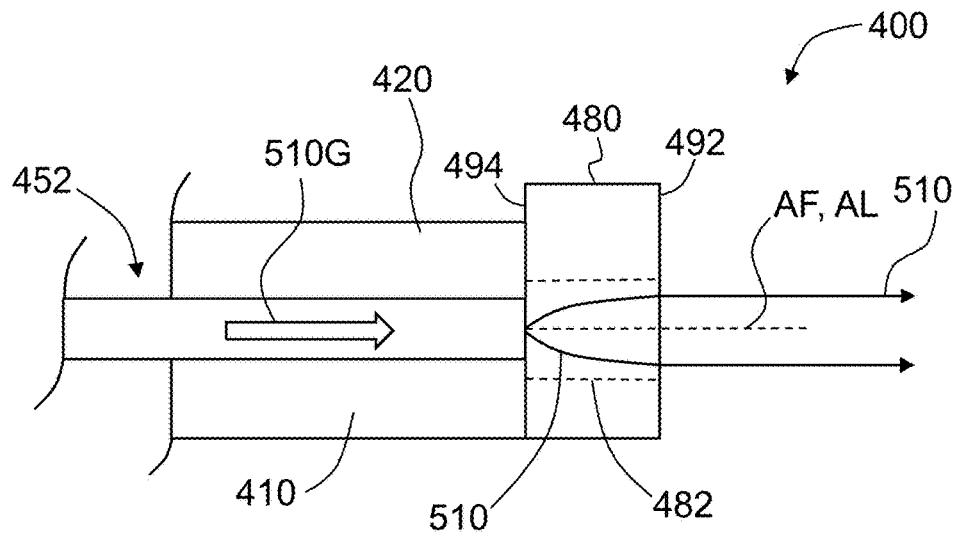
FIG. 7E is a close-up view of the front end of the fiber interface device showing an example of how guided light traveling in one of the optical fibers is collimated by one of the lenses in the collimator lens array.

FIG. 7E is a close-up side view of the fiber interface device 400 showing how guided light 510G traveling in the optical fiber 452 as a guided wave exits the end face 460 of the optical fiber and diverges as unguided light 510. The unguided light 510 initially diverges based on numerical aperture (NA) of the optical fiber. The lens element 82, which is shown as a GRIN lens, acts as a collimating lens by bending the otherwise diverging unguided light 510 until it travels as a light beam with light rays substantially parallel to the lens axis AL, thereby defining collimated light (collimated light beam) 510.

Figure 7F:
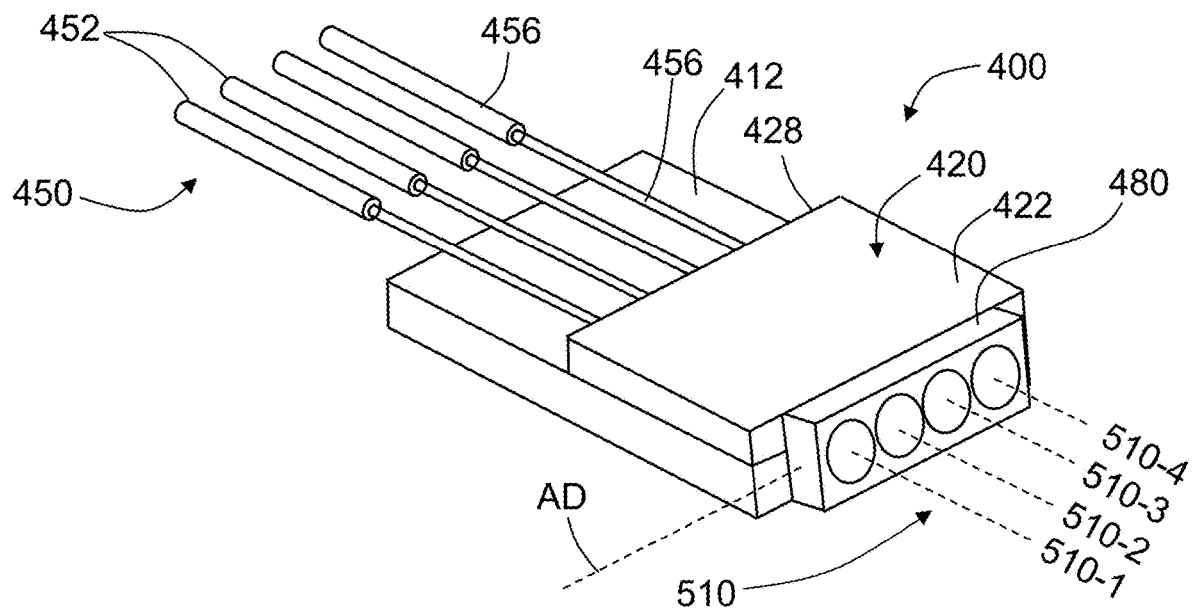
FIG. 7F is an elevated view similar to FIG. 7A and shows multi-wavelength light being transmitted on each of the four example fibers.

FIG. 7F is similar to FIG. 7A and illustrates an example fiber interface device 400 used at the back end 354 of the precision TFF POSA 350 emits multi-wavelength light 510 (e.g., having four wavelengths $\lambda_a$, $\lambda_b$, $\lambda_c$ and $\lambda_d$ that respectively define four channels) over each optical fiber 452. If there were only one optical fiber 452, then the four wavelengths would define four channels for the one multi-wavelength light beam 510. Since the fiber interface device 400 supports multiple optical fibers 452, the fiber interface device supports a corresponding number of sub-channels as carried by multiple multi-wavelength light beams 510, denoted 510-1 through 510-4 for the four example sub-channels, thereby defining a total of 16 optical communication lanes.

WDM System with Parallel Fiber Interface Devices

Figure 8A:
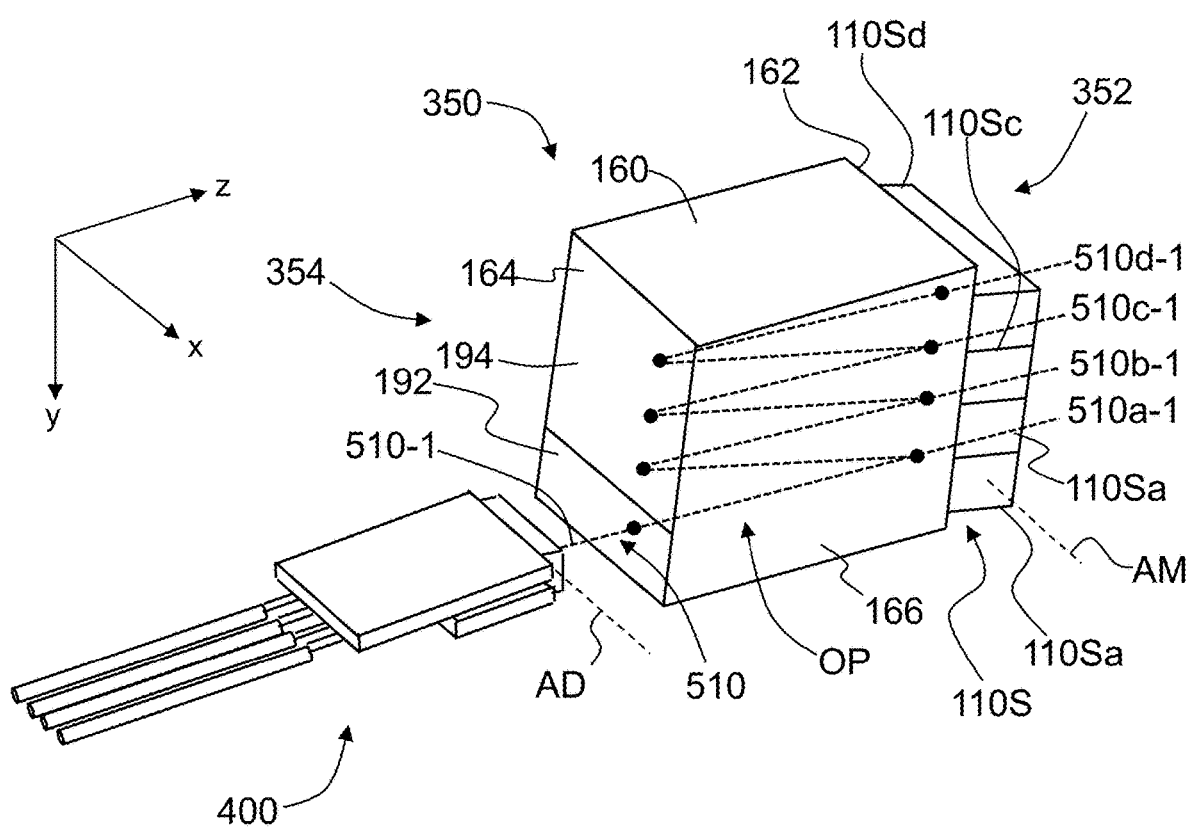
FIG. 8A is an elevated view showing a fiber interface device operably disposed adjacent the back surface of the precision TFF POSA, and showing how one of the multi-wavelength collimated light beams is divided by the TFF POSA into four separate single-wavelength light beams that respectively exit the four TFF members to define four separate channels.

FIG. 8A is an elevated view showing an example fiber interface device 400 operably disposed adjacent the back end 354 of the precision TFF POSA 350. The example fiber interface device 400 emits four collimated multi-wavelength light beams 510, such as shown in FIG. 7F, but only one collimated multi-wavelength light beam 510-1 is shown for ease of illustration, since the other collimated multi-wavelength light beams travel optical paths that are the same as the shown optical path OP but in y-z planes shifted in the x-direction.

The light beam 510-1 enters the glass block section 160S at the anti-reflection coating 192. Thus, the fiber interface device 400 being "operably disposed" adjacent the back end 354 of the precision TFF POSA 350 refers to the arrangement being such that this operation of the light beams can occur. The collimated light beam 510-1 then travels over an optical path OP while the TFF members 110S (110Sa, 110Sb, 110Sc and 110Sd) transmit their respective wavelength and reflect the other wavelengths, thereby resulting in transmitted light beams 510a-1, 510b-1, 510c-1 and 510d-1 at the front end 352 of the TFF POSA 350. The zig-zag optical path OP is generated by the parallelepiped shape of the glass block section 160S.

Figure 8B:
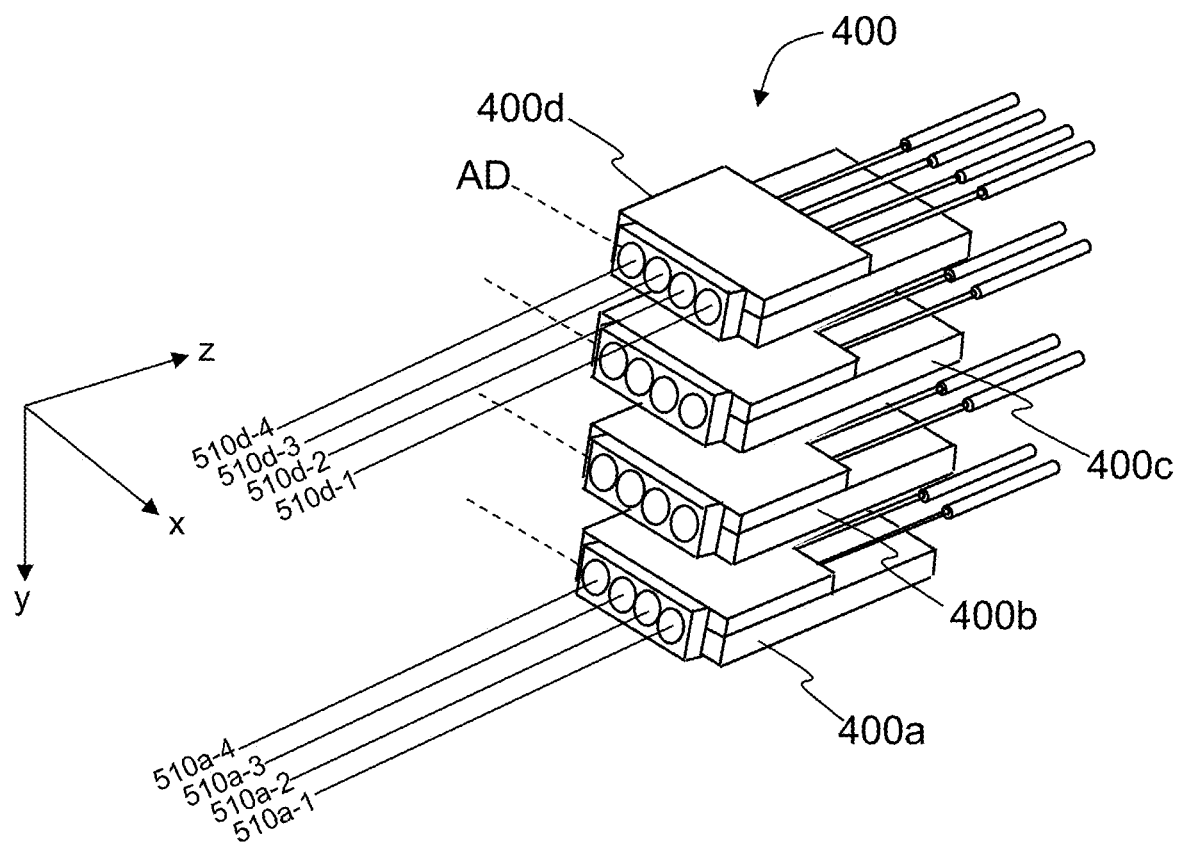
FIG. 8B is an elevated view of four stacked fiber interface devices and illustrating two example WDM light beams ($510a$ of wavelength $\lambda_a$ and $510d$ of wavelength $\lambda_d$) and their respective sub-channels ($510a$-1 through $510a$-4; $510d$-1 through $510d$-4) as received by or transmitted from the fiber interface devices.

FIG. 8B is an elevated view of four stacked fiber interface devices 400, denoted 400a through 400d, such as might be operably disposed adjacent the front end 352 of the precision TFF POSA 350. The stacking is along the y-direction so that the lens array units 480 run in the x-direction, which is the same direction as the long direction of the TFF members 110S. In other words, the device axes AD of the fiber interface devices 400 run in the same direction as the TFF member axes AM of the TFF members 110S. The fiber interface devices 400 are thus said to be parallel to the TFF POSA 350, and the stacked fiber interface devices are said to be parallel fiber interface devices.

FIG. 8B illustrates two example WDM light beams, namely light beam 510a of wavelength $\lambda_a$ and light beam 510d of wavelength $\lambda_d$. FIG. 8B also shows for each example light beam 510a and 510d their respective sub-channels, namely 510a-1 through 510a-4 and 510d-1 through 510d-4, as received by or transmitted from the two example fiber interface devices 400a and 400d, respectively. The example of four wavelengths (four channels) each having four sub-channels defines a total of sixteen optical communication lanes. Fewer or greater numbers of optical communication lanes can be defined using different configurations for the TFF POSA 350 and fiber interface devices 400.

Figure 8C:
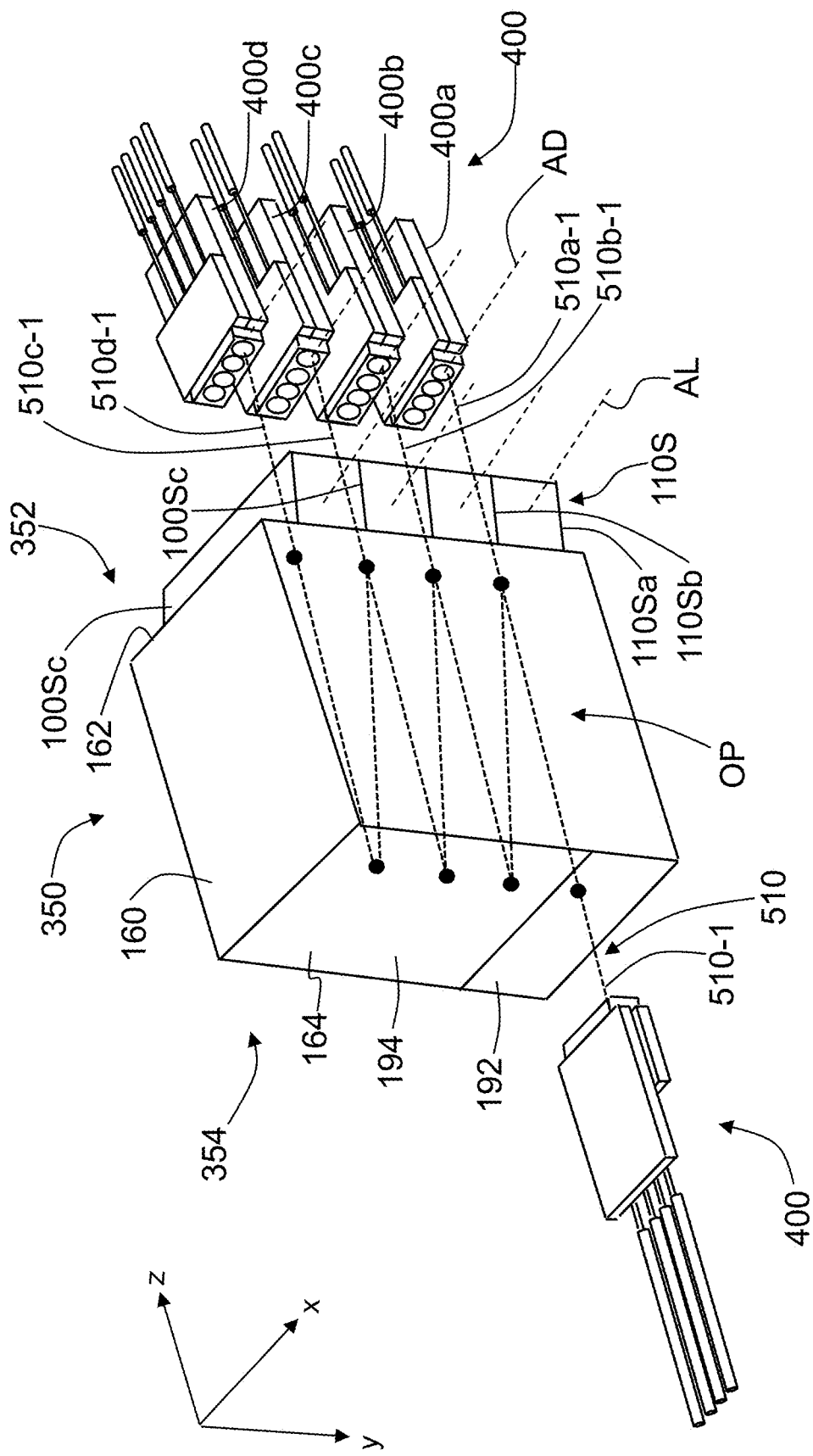
FIG. 8C is an elevated view similar to FIG. 8A and further includes the stacked fiber interface devices of FIG. 8B operably arranged at the front end of a precision TFF POSA to form a WDM system.
Figure 8D:
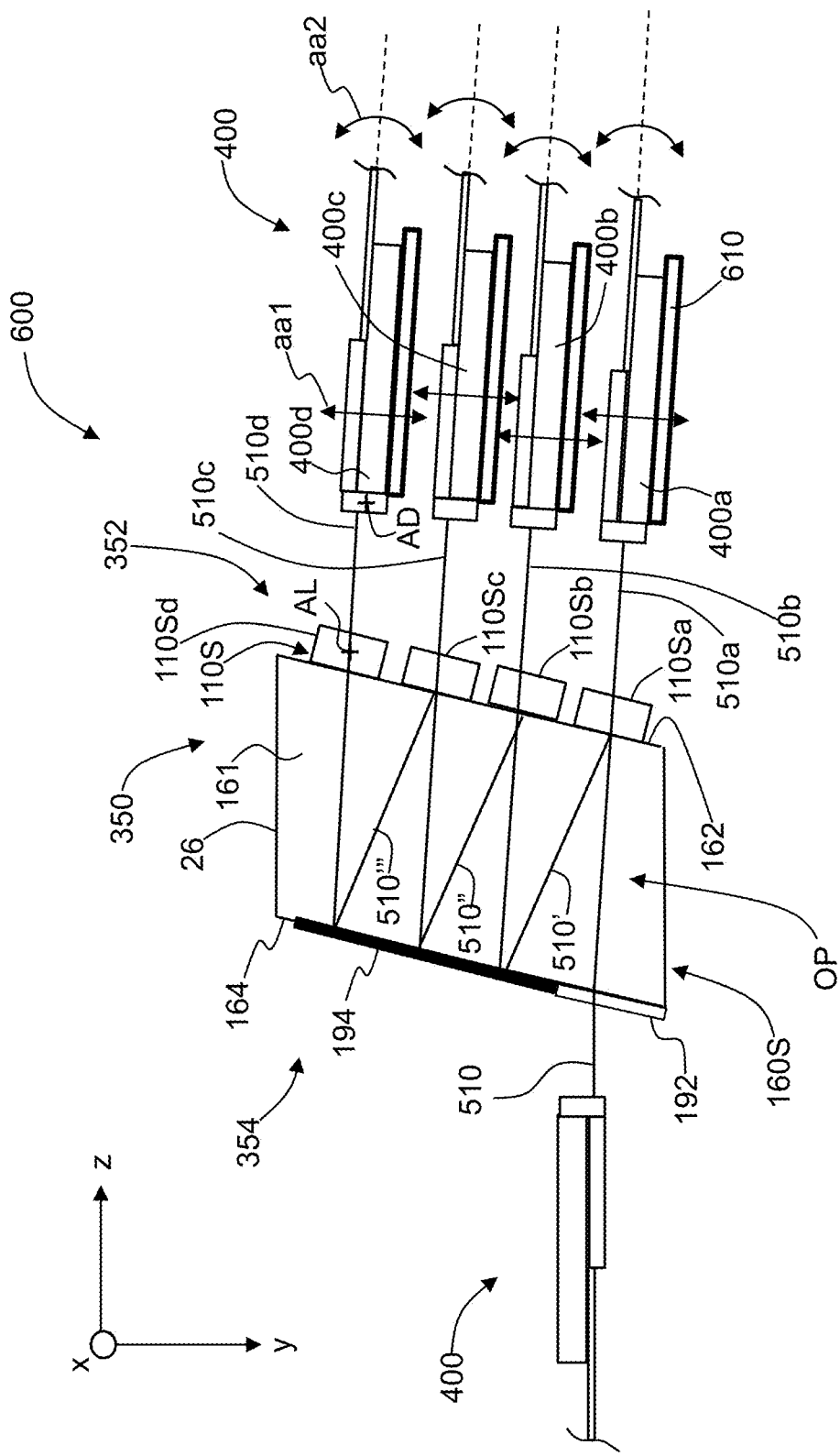
FIG. 8D is a side view of the WDM system of FIG. 8C.

FIG. 8C is similar to FIG. 8A and further includes the stacked fiber interface devices 400a through 400d operably disposed adjacent the front end 352 of the precision TFF POSA 350 to define a WDM system 600. FIG. 8D is a side view of the WDM system 600 of FIG. 8C. The fiber interface devices 400 have the aforementioned parallel configuration with respect to the TFF POSA 350, and in example, the position of each fiber interface device 400 is independently adjustable, as indicated by a first and second adjustment arrows aa1 and aa2. The first adjustment arrow aa1 shows how each fiber interface device 400 can be linearly translated in at least the y-direction. The second adjustment arrow aa2 shows how each fiber interface device 400 can be rotated at least about the x-axis. In an example, each fiber interface device is operably supported by an adjustable mount 610 (see FIG. 8D). This enables the WDM system 600 to be actively aligned by positionally adjusting one or more of the fiber interface devices 400 using the adjustable mounts until a maximum optical signal is obtained and then fixing the position of each fiber interface device for optimization of the optical signal for each channel and sub-channel.

The independent adjustability of the fiber interface devices 400 allows for compensating optical transmission errors that can cause slight deviations in the optical path OP. Note that one source of optical path deviation, namely the curvature of the TFF 120 on the TFF members 110S, is substantially reduced or eliminated by the TFF 120 being substantially flat by virtue of the fabrication method used to form the TFF POSA 350. In addition, the parallel configuration of the fiber interface devices 400 relative to the TFF members 110S allows for independent positional adjustment for each wavelength channel since there is one fiber interface device for each wavelength channel. Such adjustments are not possible with conventional vertically oriented photonic devices arrays having fixed positions of the photonic devices and that attempt to cover all of the wavelength channels using a single device structure.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of forming a precision passive optical structure assembly (POSA) for wavelength-division multiplexing (WDM) applications, comprising:
   forming respective thin film filters on respective first surfaces of two or more glass rods using a thin-film deposition process, wherein:
      each of the two or more glass rods also has a second surface substantially parallel to the first surface,
      each of the thin film filters has a thickness variation due to curvature of an optical surface of the thin film filter that is opposite the first surface of the corresponding glass rod, and
      the thin film filters have different non-overlapping wavelength transmissions;
   forming a glass rod assembly comprising the two or more glass rods arranged side-by-side so that the thin film filters reside in a common plane;
   arranging the glass rod assembly on a top surface of a master glass block with the thin film filters confronting the top surface, wherein the master glass block is elongate in a first direction;
   pressing the glass rod assembly and the master glass block together with a securing material therebetween to substantially reduce the amounts of curvature of the optical surfaces of the thin film filters;
   curing the securing material during said pressing to fix the glass rod assembly in place on the master glass block with the thin film filters having the substantially reduced amounts of curvature; and
   singulating the glass rod assembly and the master glass block after said curing, in a plane transverse to the first direction, to form the precision POSA.

2. The method according to claim 1, wherein said curing comprises exposing the securing material to actinic radiation transmitted through at least a portion of the master glass block while said pressing is performed using a top plate disposed atop the glass rod assembly.

3. The method according to claim 2, wherein the actinic radiation comprises infrared light or ultraviolet light.

4. The method according to claim 1, wherein the master glass block has opposite sides and a bottom surface opposite the top surface such that the top surface, the bottom surface, and the opposite sides define a parallelepiped shape, the method further comprising:
   forming on a first portion of the bottom surface an antireflection coating and on a second portion of the bottom surface a reflection coating.

5. The method according to claim 1, wherein said pressing is performed through a top plate disposed atop the glass rod assembly.

6. The method according to claim 1, wherein said pressing is performed using a squeezing device.

7. The method according to claim 1, wherein as a result of said singulating, the precision POSA includes respective glass rod sections of the two or more glass rods with each of the glass rod sections having a long axis, the method further comprising forming a wavelength-division multiplexing (WDM) system by:
   operably disposing a first multi-fiber interface device adjacent an antireflection coating on a bottom surface of the master glass block that is opposite the top surface; and
   operably disposing two or more second multi-fiber interface devices adjacent the two or more glass rod sections respectively, wherein each second multi-fiber interface device has a device axis that runs in substantially the same direction as the long axes of the glass rod sections.

8. The method according to claim 7, wherein the first and second multi-fiber interface devices each comprises a fiber array unit (FAU) and a collimating lens array.

9. The method according to claim 8, further comprising:
   adjustably supporting one or more of the second multi-fiber interface devices; and
   independently positionally adjusting one or more of the second multi-fiber interface devices to optimize optical communication between the first multi-fiber interface device and the second multi-fiber interface devices.

10. The method according to claim 9, wherein the positionally adjusting comprises at least one of a translation and a rotation.

11. A precision passive optical structure assembly (POSA) formed by the process comprising:
   forming respective thin film filters on respective first surfaces of two or more glass rods using a thin-film deposition process, wherein:
      each of the two or more glass rods also has a second surface substantially parallel to the first surface,
      each of the thin film filters has a thickness variation due to curvature of an optical surface of the thin film filter that is opposite the first surface of the corresponding glass rod, and
      the thin film filters have different non-overlapping wavelength transmissions;
   forming a glass rod assembly comprising the two or more glass rods arranged side-by-side so that the thin film filters reside in a common plane;
   arranging the glass rod assembly on a top surface of a master glass block with the thin film filters confronting the top surface;
   pressing the glass rod assembly and the master glass block together with a securing material therebetween to substantially reduce the amounts of curvature of the optical surfaces of the thin film filters;
   securing the glass rod assembly to the master glass block with the securing material while the thin film filters have said substantially reduced amounts of curvature; and
   singulating the glass rod assembly and the master glass block after said securing, in a plane transverse to the first direction, to form the precision POSA.

12. The precision POSA according to claim 11, wherein said securing comprises irradiating the securing material with actinic radiation through the master glass block.

13. The method according to claim 1, wherein said pressing reduces the thickness variation in thickness of the thin film filters over their respective optical surfaces by at least 50%.

14. A method of forming multiple precision passive optical structure assemblies (POSAs) for wavelength-division multiplexing (WDM) applications, comprising:
   forming respective thin film filters on respective first surfaces of at least four glass rods using a thin-film deposition process, wherein:

each of at least four glass rods also has a second surface substantially parallel to the first surface, each of the thin film filters has a thickness variation due to curvature of an optical surface of the thin film filter that is opposite the first surface of the corresponding glass rod, and the thin film filters of the at least four glass rods have different non-overlapping wavelength transmissions;

forming a glass rod assembly comprising the at least four glass rods arranged side-by-side so that the thin film filters reside in a common plane;

arranging the glass rod assembly on a top surface of a master glass block with the thin film filters confronting the top surface, wherein the master glass block is elongate in a first direction;

pressing the glass rod assembly and the master glass block together with a securing material therebetween to substantially reduce the amounts of curvature of the optical surfaces of the thin film filters;

curing the securing material during said pressing to fix the glass rod assembly in place on the master glass block with the thin film filters having the substantially reduced amounts of curvature; and after said curing, singulating the glass rod assembly and the master glass block into multiple sections to form the multiple precision POSAs, wherein said singulating is along planes transverse to the first direction.

15. The method according to claim 14, wherein the master glass block has opposite sides and a bottom surface opposite the top surface such that the top surface, the bottom surface, and the opposite sides define a parallelepiped shape, the method further comprising:

forming on a first portion of the bottom surface an antireflection coating and on a second portion of the bottom surface a reflection coating.

16. The method according to claim 15, wherein as a result of said singulating, each of the multiple precision POSAs includes respective glass rod sections of the at least four glass rods with each of the glass rod sections having a long axis, the method further comprising forming a wavelength-division multiplexing (WDM) system with a first precision POSA of the multiple precision POSAs by:

operably disposing a first multi-fiber interface device adjacent the antireflection coating on the bottom surface of master glass block of the first precision POSA; and operably disposing at least four multi-fiber interface devices adjacent the at least four glass rod sections respectively, wherein each second multi-fiber interface device has a device axis that runs in substantially the same direction as the long axes of the glass rod sections.

17. The method according to claim 16, wherein the first and second multi-fiber interface devices each comprises a fiber array unit (FAU) and a collimating lens array.

18. The method according to claim 17, further comprising:

adjustably supporting one or more of the second multi-fiber interface devices; and independently positionally adjusting one or more of the second multi-fiber interface devices to optimize optical communication between the first multi-fiber interface device and the second multi-fiber interface devices.

19. The method according to claim 18, wherein the positionally adjusting comprises at least one of a translation and a rotation.

20. The method according to claim 14, wherein said pressing reduces the thickness variation in thickness of the thin film filters over their respective optical surfaces by at least 50%.

* * * * *